(12) United States Patent
Burgan et al.

(10) Patent No.: US 6,675,022 B2
(45) Date of Patent: Jan. 6, 2004

(54) METHOD AND APPARATUS FOR PROVIDING LOCALIZED INFORMATION TO A COMMUNICATION DEVICE IN A WIDE AREA COMMUNICATION SYSTEM

(75) Inventors: John M. Burgan, N. Palm Beach, FL (US); Eugene Lopatukhin, Boca Raton, FL (US)

(73) Assignee: Motorola Inc., Schaumburg, IL (US)

( * ) Notice: Subject to any disclaimer, the term of this patent is extended or adjusted under 35 U.S.C. 154(b) by 203 days.

(21) Appl. No.: 09/944,871

(22) Filed: Aug. 31, 2001

(65) Prior Publication Data

US 2003/0045314 A1 Mar. 6, 2003

(51) Int. Cl.$^7$ ................................................. H04B 7/00
(52) U.S. Cl. .................. 455/524; 455/561; 455/458; 455/517
(58) Field of Search .................................... 455/524, 458, 455/561, 463, 422.1, 525, 552.1, 447, 500, 507, 517; 370/328; 340/7.27

(56) References Cited

U.S. PATENT DOCUMENTS

| | | | |
|---|---|---|---|
| 4,994,797 A | 2/1991 | Breeden | |
| 5,857,155 A | 1/1999 | Hill et al. | |
| 5,974,034 A | * 10/1999 | Chin et al. | 370/328 |
| 6,006,069 A | * 12/1999 | Langston | 455/524 |
| 6,044,069 A | * 3/2000 | Wan | 455/458 |
| 6,091,959 A | 7/2000 | Souissi et al. | |
| 6,175,740 B1 | 1/2001 | Souissi et al. | |
| 6,278,883 B1 | * 8/2001 | Choi | 455/552.1 |
| 6,298,239 B1 | * 10/2001 | Yonemoto et al. | 455/458 |
| 6,522,877 B1 | * 2/2003 | Lietsalmi et al. | 455/422.1 |
| 6,549,783 B1 | * 4/2003 | Touzeau et al. | 455/463 |
| 6,553,234 B1 | * 4/2003 | Florea | 455/447 |

* cited by examiner

Primary Examiner—Quochien B. Vuong
Assistant Examiner—Lana Le
(74) Attorney, Agent, or Firm—Randi L. Dulaney; Lawrence J. Chapa

(57) ABSTRACT

A wide area communication system (100,200) employs a method and apparatus for providing a localized information (410) to a communication device (500) located in the wide area communication system (100,200). The wide area communication system (100,200) includes a plurality of local coverage areas (110–112, 219–225) that are each served by one or more broadcast transmission sites (103–108, 203–212). A broadcast transmission site (300) providing communication service to a local coverage area that includes the communication device (500) transmit, during a first pre-allocated time interval and/or together with a first pre-allocated broadcast address, information relating to their local coverage area. During a second time interval and/or together with an individual address (414) of the communication device (500), the same broadcast transmission sites together with other broadcast transmission sites in the wide area communication system (100, 200) transmit an individualized information (418) to the communication device (500).

28 Claims, 10 Drawing Sheets

METHOD AND APPARATUS FOR PROVIDING LOCALIZED INFORMATION TO A COMMUNICATION DEVICE IN A WIDE AREA COMMUNICATION SYSTEM

BACKGROUND OF THE INVENTION

1. Field of the Invention

The present invention relates generally to communication systems and, in particular, to a method and apparatus for providing localized information to communication devices operating in a wide area communication system.

2. Description of the Related Art

Wide area communication systems, such as paging systems, cellular telephone systems, and two-way radio systems, are well known. Such systems provide communication service to large numbers of communication devices distributed throughout a wide geographic area. To provide communication service to the communication devices, wide area systems typically include, inter alia, control and routing equipment, such as system controllers, base site controllers, paging controllers, routers, switches, and other known devices, and base or broadcast transmission sites that provide information to and receive information from the communication devices over wireless resources or channels. The geographic areas of wide area systems are typically subdivided into smaller regions referred to as "coverage areas," with each coverage area being serviced by one or more broadcast transmission sites depending on system traffic density and other system design considerations.

In wide area systems, messages and/or other information are delivered to communication devices based on the type of system and the system protocol. In most systems, each communication device includes an individual address or identification (ID). Thus, when information is intended for one communication device only, the information is transmitted together with the individual address of the communication device. For example, in a one-way paging system, after receiving a request to page a particular communication device, the communication device's individual address (e.g., pager number), and a desired message intended for the communication device, the paging controller sends the communication device's individual address and the desired message to all broadcast transmission sites in the system. At the appropriate time, in accordance with the paging protocol of the system, the broadcast sites simultaneously transmit (i.e., simulcast) the desired message and the individual address in their respective coverage areas, effectively transmitting the message throughout the entire system. Simulcasting in this manner insures that the target communication device receives the message regardless of which coverage area the device is currently located in.

In other systems, the communication devices can include an individual address and a group or broadcast address to enable the devices to receive messages intended for their respective groups as well as messages intended for them individually. One such use of a broadcast address is to provide information to communication device users that subscribe to a national news service. For example, in a paging system that provides paging service throughout the entire United States (typically referred to as a nationwide paging system), paging customers can also subscribe to a news service that couples into the paging system. The news service provides its subscribers with periodic updates (short text messages) regarding information of national importance, such as stock updates, technology updates, and national news. The news service could send the updates to each subscriber individually using the individual address of the subscriber's communication device. However, such individual messaging to large numbers of devices would be an inefficient use of system resources. Therefore, the communication device of each service subscriber is typically programmed with a broadcast address associated with the particular service. When a news service update is received at the nationwide paging system controller, the paging system either sends the update to the broadcast transmission sites for simulcasting (e.g., when the update includes the corresponding broadcast address) or prepends the appropriate broadcast address to the update and then sends the broadcast address/update combination to the broadcast transmission sites. At the appropriate time, in accordance with the paging protocol, the broadcast transmission sites transmit the update and broadcast address throughout the system, thereby providing the update to all the subscribing communication devices simultaneously and efficiently.

Although the above-described nationwide news service broadcasts are efficient for conveying information of national importance, such broadcasts are not very efficient for conveying localized information. For example, nationwide broadcasting of local traffic information for Miami, Fla. is not an efficient use of the resources at broadcast sites in, for example, Los Angeles, Calif. because news service subscribers in Los Angeles are not likely interested in the traffic conditions in Miami. For that matter, news service subscribers in Jacksonville, Fla. are not likely interested in the traffic conditions in Miami either.

Therefore, a need exists for a method and apparatus for providing localized information to communication devices operating in a wide area communication system that efficiently utilizes system resources to convey the localized information.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT(S)

Figure 1:
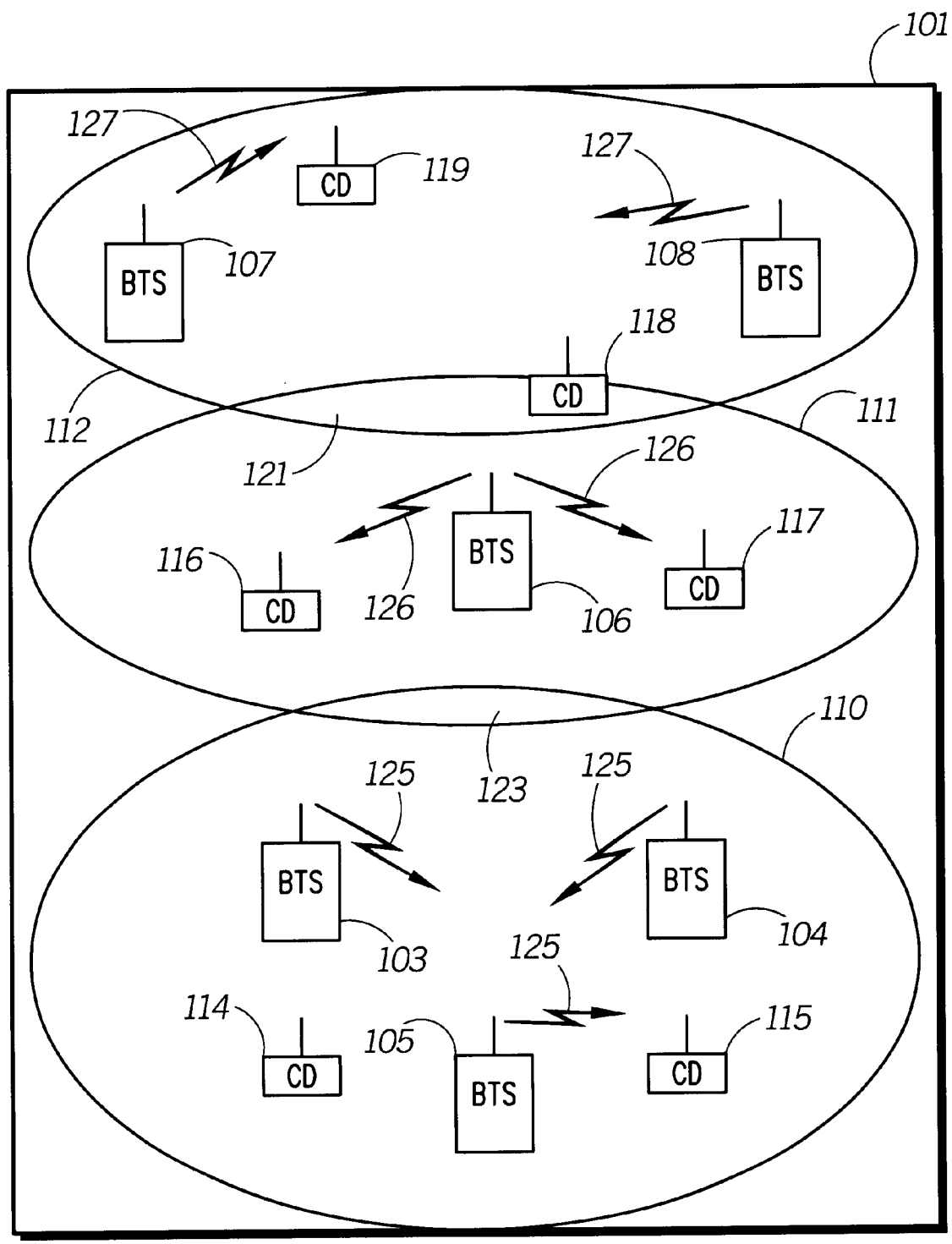
FIG. 1 is a block diagram of a communication system that operates in accordance with a preferred embodiment of the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Generally, the present invention encompasses a method and apparatus for providing localized information to a communication device that is located in a wide area communication system. The wide area communication system is subdivided into several local coverage areas or regions. One or more broadcast transmission sites serve each local coverage area. In a preferred embodiment, broadcast transmission sites providing communication service to a predetermined group of local coverage areas transmit, during a first time interval, information relating to their respective local coverage areas that is intended to be received by all communication devices subscribing to a local information service sourcing the information. During a second time interval, the same broadcast transmission sites together with other broadcast transmission sites in the wide area communication system transmit individualized information that is intended to be received by less than all the communication devices that subscribe to the local information service (e.g., a page to a single communication device).

Alternatively, broadcast transmission sites providing communication service to a predetermined group of local coverage areas transmit, at any time, information relating to their respective local coverage areas together with a broadcast address assigned for use in such local coverage areas. The same broadcast transmission sites together with other broadcast transmission sites in the wide area communication system transmit, at any other time, individualized information together with an individual address of the communication device or devices for which the individualized information is specifically intended.

By providing localized and individualized information to communication devices in this manner, the present invention permits resource efficient distribution of localized information by broadcasting such information to all communication devices in a particular local coverage area during a pre-established time interval and/or with a pre-established accompanying broadcast address. By contrast, prior art systems either provide localized information inefficiently by providing such information to communication devices on an individual basis, instead of a group basis, or don't provide localized information at all (e.g., provide national information, such as stock quotes, national news, or scores of sporting events, by associating the national information with a broadcast address, but do not provide information, such as traffic or weather, on a local basis).

In addition to providing the localized information to the communication device, the present invention also provides for storing the localized information in the memory area of the communication device by replacing some previously stored localized information with more recently received localized information regardless of the type of the localized information, instead of maintaining a separate memory location for each type of localized information. Such a storage method enables low memory communication devices, such as some pagers, to efficiently store both localized information and individualized information in a manner consistent with the access and use of such information by the users of the communication devices.

FIG. 1 illustrates a block diagram of a wide area communication system 100 that provides communication services to a wide geographic area 101 in accordance with a preferred embodiment of the present invention. The wide area communication system 100 includes, inter alia, a plurality of broadcast transmission sites 103–108 (illustrated as "BTS" in FIG. 1) and a plurality of communication devices 114–119 (illustrated as "CD" in FIG. 1). Each of the plurality of broadcast transmission sites 103–108 provides communication service to a respective one of a plurality of local coverage areas 110–112. As shown, multiple broadcast transmission sites can provide communication service to the same local coverage area. For example, as depicted in FIG. 1, the plurality of broadcast transmission sites 103–105 provide communication service to the local coverage area 110, and the broadcast transmission sites 107 and 108 provide communication service to the local coverage area 112. The quantity of broadcast transmission sites that serve a particular local coverage area depends on the particular configuration of the wide area communication system 100.

In the preferred system, adjacent local coverage areas overlap to form one or more overlap areas such as an overlap area 121 and a second overlap area 123 (two shown) that are effectively served by the broadcast transmission sites whose local coverage areas are overlapping. It will be appreciated by one of ordinary skill in the art that the overlap areas 121, 123 are employed to reduce the likelihood of service coverage holes in the wide area communication system 100.

The plurality of broadcast transmission sites 103–108 convey information to the plurality of communication devices 114–119 over one or more of a plurality of wireless communication resources 125–127. Each of the plurality of wireless communication resources 125–127 can comprise a frequency carrier, one or more time slots of a frequency carrier, or an orthogonal code implemented by a respective frequency hopping pattern or by a pseudo-random noise sequence spread over a wide (e.g., 3 MHz) bandwidth. It will be appreciated by one of ordinary skill in the art that the plurality of wireless communication resources 125–127, in accordance with the present invention, can comprise any of the wireless communication resources mentioned above or an equivalent.

It will be appreciated by one of ordinary skill in the art that the wide area communication system 100, in accordance with the present invention, can comprise a two-way radio system, a cellular telephone system, a personal communication system (PCS), a wireless data system, a paging system, or any combination thereof. In the following description, the term "wide area communication system" refers to any of the wide area communication systems mentioned above or an equivalent. Similarly, it will be appreciated by one of ordinary skill in the art that the plurality of communication devices 114–119 can comprise two-way mobile or portable radios, radiotelephones, one-way or two-way pagers, wireless data terminals, or any combination thereof. In the following description, the term "communication devices" refers to any of the plurality of communication devices mentioned above or an equivalent. A preferred communication device is described in detail below with respect to FIG. 5. It will be appreciated by one skilled in the art that dependent upon the type of the wide area communication system 100, the plurality of broadcast transmission sites 103–108 can comprise transmitters, receivers, control and storage equipment, and telephone interconnect equipment. A preferred broadcast transmission site is described below with respect to FIG. 3.

Figure 2:
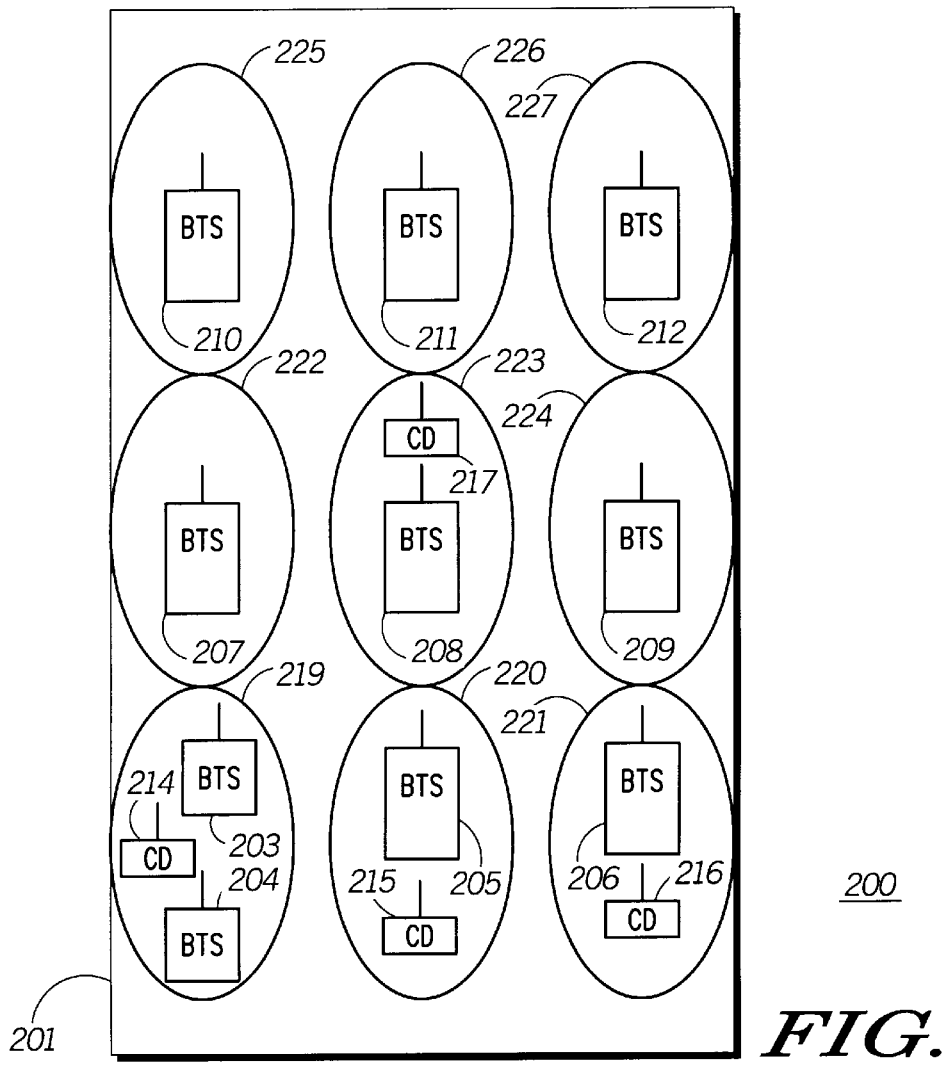
FIG. 2 is a block diagram of a communication system that operates in accordance with an alternative embodiment of the present invention.

FIG. 2 is a block diagram of a second wide area communication system 200 that operates in accordance with an alternative embodiment of the present invention. Similar to the wide area communication system 100 of FIG. 1, the second wide area communication system 200 of FIG. 2 provides communication service to a second wide geographic area 201 and includes, inter alia, a second plurality of broadcast transmission sites 203–212 (illustrated as "BTS" in FIG. 2) and a second plurality of communication devices 214–217 (illustrated as "CD" in FIG. 2). Each broadcast transmission site 203–212 provides communication service to a second plurality of local coverage areas 219–225 within the second wide geographic area 201 of the second wide area communication system 200. Operation of the second wide area communication system 200 of FIG. 2 will be described in detail below with respect to FIGS. 8 and 9.

It will be appreciated by one of ordinary skill in the art that the second wide area communication system 200, in accordance with the present invention, can comprise a two-way radio system, a cellular telephone system, a personal communication system (PCS), a wireless data system, a paging system, or any combination thereof. In the following description, the term "second wide area communication system" refers to any of the wide area communication systems mentioned above or an equivalent. Similarly, it will be appreciated by one of ordinary skill in the art that the second plurality of communication devices 214–217 can comprise two-way mobile or portable radios, radiotelephones, one-way or two-way pagers, wireless data terminals, or any combination thereof. In the following description, the term "communication devices" refers to any of the plurality of communication devices mentioned above or an equivalent. A preferred communication device is described in detail below with respect to FIG. 5. It will be appreciated by one skilled in the art that dependent upon the type of the second wide area communication system 200, the second plurality of broadcast transmission sites 203–212 can comprise transmitters, receivers, control and storage equipment, and telephone interconnect equipment. A preferred broadcast transmission site is described below with respect to FIG. 3.

Figure 3:
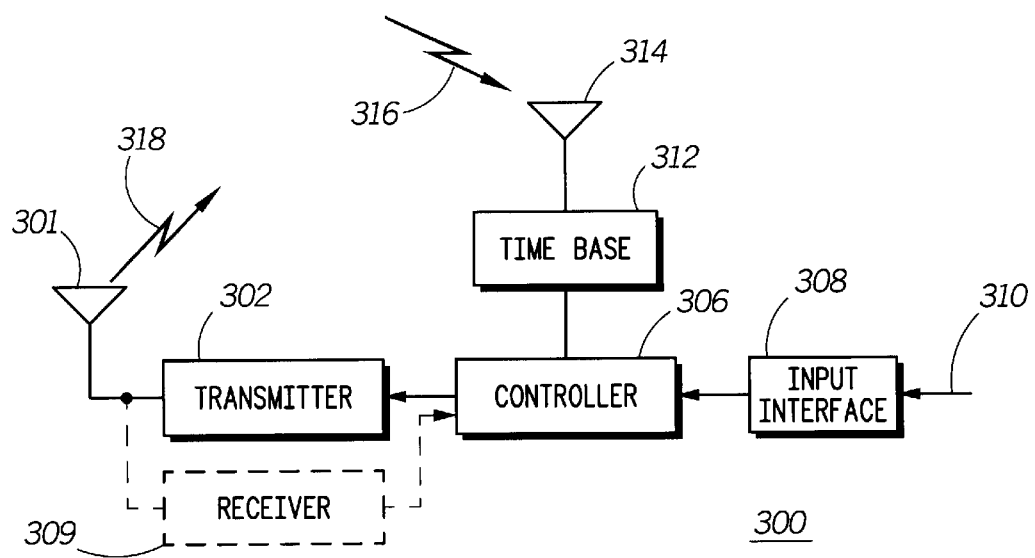
FIG. 3 is a block diagram of a broadcast transmission site in accordance with the present invention.

FIG. 3 is a block diagram of a broadcast transmission site 300 that operates in accordance with the present invention. The broadcast transmission site 300 preferably includes an antenna 301 for transmitting information to (and optionally receiving information from) one or more communication devices such as the plurality of communication devices 114–119 of FIG. 1 and the second plurality of communication devices 214–217 of FIG. 2, a transmitter 302 coupled to the antenna 301, a controller 306 coupled to the transmitter 302, an input interface 308 coupled to the controller 306, a time base 312 coupled to the controller 306, and a time base antenna 314 coupled to the time base 312. The broadcast transmission site 300 can optionally include a receiver 309 coupled to the antenna 301 and the controller 306 when the broadcast transmission site 300 is capable of two-way operation (e.g., comprises one or more base stations). The broadcast transmission site 300 of FIG. 3 is preferably used to implement all of the plurality of broadcast transmission sites 103–108 and the second plurality of broadcast transmission sites 203–212 in the wide area communication system 100 and the second wide area communication system 200 of FIGS. 1 and 2, respectively.

As is well known by those skilled in the art, the transmitter 302 includes filters, mixers, a modulator, large-signal amplifiers, and other known elements to produce a radio frequency or microwave signal such as a signal 318 including information to be conveyed to one or more of the plurality of communication devices 114–119, or the second plurality of communication devices 214–217 over one or more of the plurality of wireless communication resources 125–127.

The controller 306 is a conventional computer or microcomputer system used for controlling, in accordance with one or more programs stored in a memory of the controller 306, the operation of the transmitter 302 and/or the receiver 309. Preferably, the controller 306 is similar to the MC68328 micro-controller manufactured by Motorola, Inc. of Schaumburg, Ill. It will be appreciated that other similar controllers can be utilized for the controller 306, and that additional controllers of the same or alternative type can be added as required to handle the processing requirements of the controller 306. The controller 306 is coupled to the input interface 308 to receive information intended for one or more of the plurality of communication devices 114–119 or the second plurality of communication devices 214–217. The information is processed by the controller 306 using conventional signal processing techniques in accordance with a communication protocol utilized by the wide area communication system 100 and the second wide area communication system 200. The processed information is provided to the transmitter 302 at appropriate times in accordance with the communication protocol for conversion into signals intended for transmission to one or more of the plurality of communication devices 114–119 located within the wide geographic area 101 of the wide area communication system 100 and to one or more of the second plurality of communication devices 214–217 located within the second wide geographic area 201 of the second wide area communication system 200. Thus, as described above, the transmitter 302 is under the control of the controller 306 and, therefore, receives transmission instructions from the controller 306.

The input interface 308 preferably comprises a standard modem and is coupled to a communication link 310, such as a conventional telephone line, a leased line, a coaxial cable, a fiber optic cable, a hybrid-fiber coaxial network, a microwave link, the internet, or any other communications medium capable of supporting transmission of voice and/or data information, in order to receive information from at least one information source (not shown), such as a paging controller, a base site controller, a system controller, the public switched telephone network, a news service, or any other entity that desires to have information transmitted to one or more of the plurality of communication devices 114–119 in the wide area communication system 100 or to one or more the second plurality of communication devices 214–217 in the second wide area communication system 200. The information received from the information source or sources can comprise alphanumeric messages (e.g., pages or short messages) and/or voice messages constituting information for a particular communication device or devices of the plurality of communication devices 114–119 or the second plurality of communication devices 214–217 (individualized information) or information relating to the local coverage area served by the broadcast transmission site 300 (localized information). It will be appreciated by one of ordinary skill in the art that the information received from the information source or sources, in accordance with the present invention, can comprise any of the message formats mentioned above or an equivalent.

The time base 312 receives a plurality of synchronization signals 316 from a common time base such as, for example, a global positioning satellite (GPS). The Global Positioning System (GPS) is a worldwide radio-navigation system formed from a constellation of 24 satellites and their ground stations. GPS uses these "man-made stars" as reference points to calculate positions accurate to a matter of meters. The time base 312 uses the satellites in space as reference points for locations here on earth. The time base 312 measures distance using the travel time of radio signals. The time base 312 has very accurate timing to measure travel time. Along with distance, the time base 312 knows exactly where the satellites are in space. Finally the time base 312 corrects for any delays the signal experiences as it travels through the atmosphere. The plurality of synchronization signals 316 are received by the time base antenna 314 utilizing conventional means that are well known in the art. The time base 312 uses the plurality of synchronization signals 316 to synchronize itself to the system's communication protocol.

In the preferred embodiment, the wide area communication system utilizes a communication protocol known as the "FLEX™" digital signaling protocol ("FLEX" is a trademark of Motorola, Inc.). The "FLEX™" protocol was developed by Motorola, Inc. of Schaumburg, Ill. and is presently used by various system operators in the United States and in several other countries. More details of the "FLEX™" protocol can be found in U.S. Pat. No. 5,371,737, assigned to Motorola, Inc. It will be appreciated that other communication protocols, such as the post office code for standardization advisory group (POCSAG) protocol, that operate in a synchronous communication system and that are suitable to the present invention can alternatively be used. However, in the discussion below, it is assumed that the "FLEX™" protocol is used. The contents of signals including localized and individualized information configured in accordance with the "FLEX™" protocol are described below with respect to FIG. 4.

The controller 306 is also coupled to the time base 312 in order to process information received from the input interface 308 in a manner that synchronizes such received information to the communication protocol. The controller 306 delivers the synchronized information to the transmitter 302, which then modulates it into signals such as the signal 318 for transmission to the recipient communication device or devices of the plurality of communication devices 114–119 and the second plurality of communication devices 214–217 via the antenna 301. The transmitter 302 transmits the signal 318 at a power level sufficient for the signal 318 to be received by the plurality of communication devices 114–119 and the second plurality of communication devices 214–217 located within the respective local coverage area of the broadcast transmission site 300.

In an embodiment in which the broadcast transmission site 300 includes the receiver 309, the receiver 309 includes well-known components, such as filters, mixers, small-signal amplifiers, a demodulator, and other known elements necessary to produce analog or digital baseband representations of signals received from the communication devices. Such representations are provided to the controller 306 for further processing and recovery of the information contained in the signals.

Figure 4:
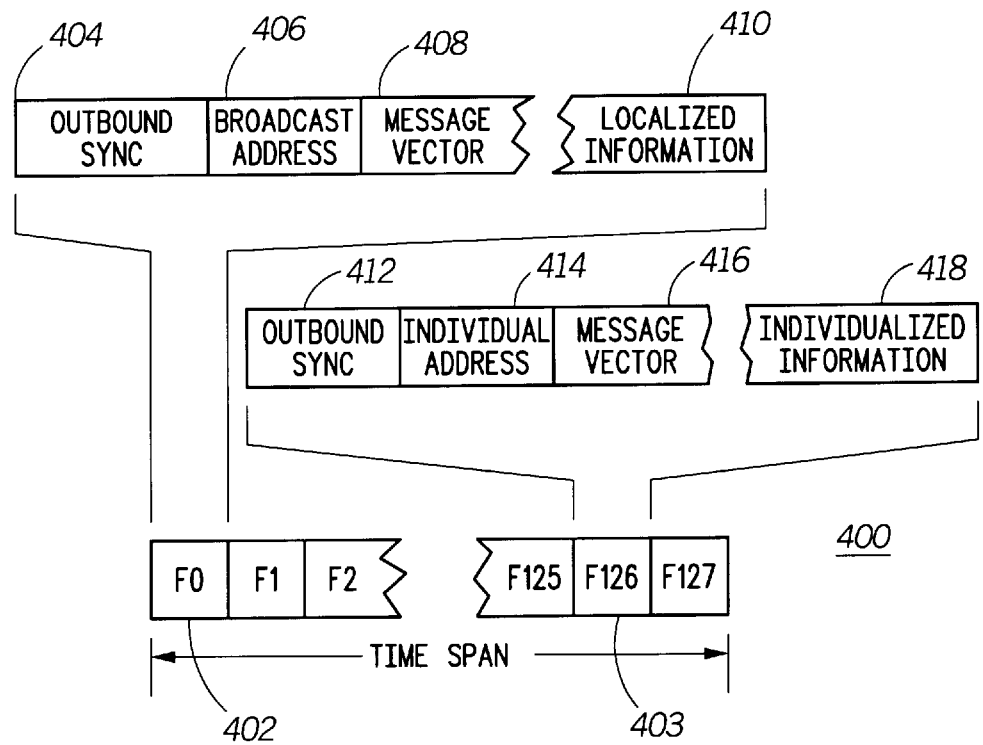
FIG. 4 illustrates contents of signals including localized and individualized information transmitted during particular transmission frames of a communication protocol utilized in accordance with a preferred embodiment of the present invention.

FIG. 4 illustrates contents of the signal 318 including localized and individualized information transmitted by the plurality of broadcast transmission sites 103–108 or the second plurality of broadcast transmission sites 203–212 in accordance with the preferred communication protocol 400. It will be appreciated by one skilled in the art that the communication protocol 400 can be the FLEX™ protocol or an equivalent. As shown, the communication protocol 400 comprises a plurality of synchronous transmission frames 402, 403 (shown as F0, F1, F2, . . . F127, by way of example). The plurality of synchronous transmission frames 402, 403 are transmitted during a periodically occurring time span corresponding to a transmission cycle that has a predetermined duration (e.g., 4 minutes) and that includes a predetermined number of the plurality of synchronous transmission frames 402, 403 (e.g., 128 frames). Each of the plurality of synchronous transmission frames 402, 403 corresponds to a predetermined time interval (e.g., 1.875 seconds).

Each of the plurality of synchronous transmission frames 402, 403 includes, inter alia, an outbound sync 404, 412, an address such as a broadcast address 406 or an individual address 414, a message vector 408, 416, and outbound information such as a localized information 410 and an individualized information 418. The outbound sync 404, 412 is used by the plurality of communication devices 114–119 and the second plurality of communication devices 214–217 as a means for bit synchronization utilizing techniques well known in the art. The address 406, 414 is used to identify the communication devices intended to receive the outbound information such as the localized information 410 and the individualized information 418. In accordance with the present invention, each of the plurality of communication devices 114–119 and the second plurality of communication devices 214–217 is assigned an address such as the individual address 414. In addition, at least some of the plurality of communication devices 114–119 and the second plurality of communication devices 214–217 are assigned respective broadcast addresses 406. Further, when the wide area communication system 100 or the second wide area communication system 200 is a two-way dispatch system, at least some of the plurality of communication devices 114–119 and the second plurality of communication devices 214–217 are assigned talkgroup addresses (which function similar to individual addresses). Each of the individual addresses 414 or talkgroup addresses are included in the synchronous transmission frame 402 including the individualized information 418. In accordance with the present invention, the synchronous transmission frame 402 including the individualized information 418 is transmitted by broadcast transmission sites such as the broadcast transmission site 300 in multiple local coverage areas. In a preferred paging system, the synchronous transmission frame 402 including the individualized information 418 is transmitted by the plurality of broadcast transmission sites 103–108 and the second plurality of broadcast transmission sites 203–212 in the wide area communication system 100 and the second wide area communication system 200, respectively.

Thus, the individualized information 418, as used herein, is information intended for a single communication device or a group of communication devices that can be located anywhere in the wide area communication system 100 or the second wide area communication system 200. By contrast, the localized information 410, as used herein, is information, such as local news information, local traffic information, local weather information, and so forth, which is intended for communication devices located within a particular local coverage area. Accordingly, the transmission frame 403 including the localized information 418 is transmitted by broadcast transmission sites in the particular local coverage area only. As discussed in more detail below, broadcast transmission sites serving different local coverage areas can broadcast signals including respective localized information 418 during the same transmission frame 403.

The message vector 408, 416 points to a time within the signaling format of the communication protocol 400 corresponding to the position of the outbound information 410, 418 intended to be received by a communication device or devices of the plurality of communication devices 114–119 and the second plurality of communication devices 214–217.

Figure 5:
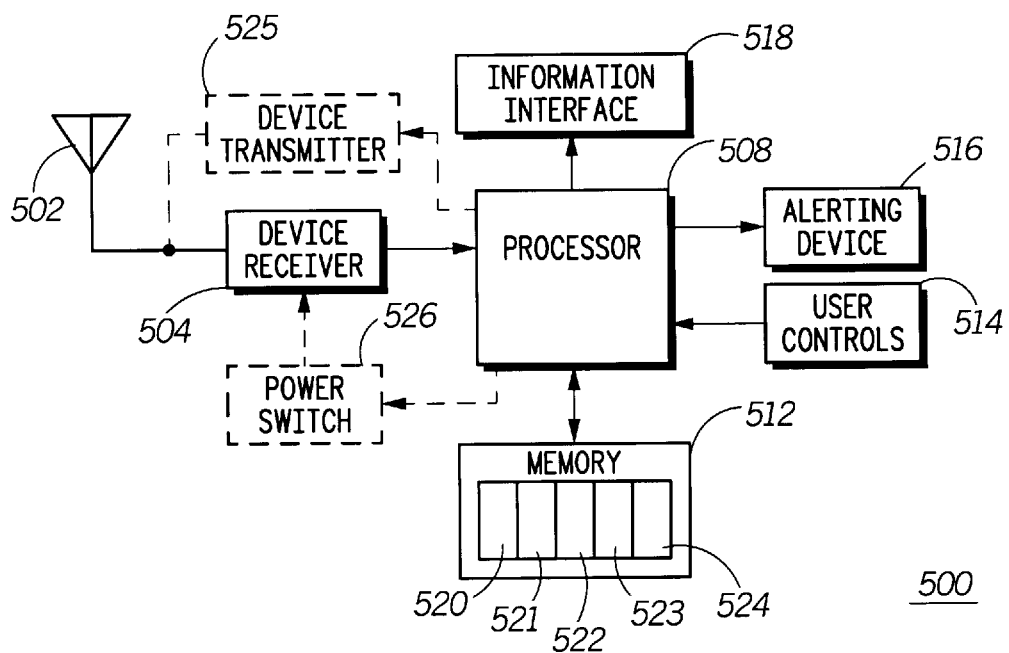
FIG. 5 is a block diagram of a communication device in accordance with the present invention.

FIG. 5 is a block diagram of a communication device 500 in accordance with a preferred embodiment of the present invention. The communication device 500 includes a device antenna 502, a device receiver 504, a processor 508, a memory 512 having a plurality of memory locations 520–524, one or more user controls 514, an alerting device 516, and an information interface 518. The communication device 500 can optionally include a device transmitter 525 (e.g., when the communication device 500 is capable of two-way operation) and/or a power switch 526 (e.g., to strobe the power sourced to the device receiver 504, thereby providing a battery saving function). Both the device transmitter 525 and the power switch 526 are well known by those skilled in the art; thus no further discussion will be presented except to facilitate an understanding of the present invention. The communication device 500 of FIG. 5 is preferably used to implement all of the plurality of communication devices 114–119 in the wide area communication system 100 of FIG. 1 and the second plurality of communication devices 214–217 in the second wide area communication system 200 of FIG. 2.

The device antenna 502 is a conventional antenna capable of receiving signals transmitted from the plurality of broadcast transmission sites 103–108 and the second plurality of broadcast transmission sites 203–212. The device receiver 504 is a conventional receiver for receiving the signal 318 during at least one predetermined transmission frame of the plurality of synchronous transmission frames 402, 403 in accordance with the communication protocol 400, and for decoding the received information to provide decoded information to the processor 508. The device receiver 504 includes components well-known by those skilled in the art, such as filters, mixers, small-signal amplifiers, a demodulator, and other known elements necessary to receive, demodulate, and decode information-bearing signals such as the signal 318 in accordance with the communication protocol 400 utilized in the wide area communication system 100 and the second wide area communication system 200.

The processor 508 comprises one or more microprocessors and/or one or more digital signal processors. Preferably, the processor 508 is similar to the MC68328 microcontroller manufactured by Motorola, Inc. of Schaumburg, Ill. It will be appreciated by one of ordinary skill in the art that other similar processors can be utilized for the processor 508, and that additional processors of the same or alternative type can be utilized as required to handle the processing requirements of the processor 508. The memory 512 is coupled to the processor 508 and comprises a read-only memory (ROM), a random-access memory (RAM), a programmable ROM (PROM), and/or an electrically erasable read-only memory (EEPROM). The memory 512 includes the plurality of memory locations 520–524 (five shown) for storing, inter alia, the computer programs executed by the processor 508, the broadcast address 406 and the individual addresses 414 assigned to the communication device 500, and information received from the plurality of broadcast transmission sites 103–108 and the second plurality of broadcast transmission sites 203–212 for later retrieval by a user of the communication device 500. The computer programs are preferably stored in ROM or PROM and direct the processor 508 in controlling the operation of the communication device 500. The broadcast address 406 and the individual addresses 414 of the communication device 500 are preferably stored in EEPROM and the information received from the plurality of broadcast transmission sites 103–108 and the second plurality of broadcast transmission sites 203–212 is preferably stored in RAM. In a preferred embodiment of a communication device having very limited memory (e.g., a small pager), multiple memory locations (e.g., locations 521–524) are reserved for storage of received individualized information 418; whereas, only one memory location 520 is reserved for storage of received localized information 410. Utilization of the plurality of memory locations 520–524 reserved for received localized and individualized information will be discussed in more detail below.

The processor 508 is preferably programmed to alert the user of the communication device 500 of its receipt and storage of information by way of the alerting device 516, which uses a conventional vibration or audible alerting mechanism. Once the user has been alerted, the user can invoke functions provided by the user controls 514 to perceive the stored information. Responsive to signaling from the user controls 514, the processor 508 directs the stored information to the information interface 518. The information interface 518 presents the selected stored information to the user by way of a conventional liquid crystal display (LCD) or other visual display, or alternatively by way of a conventional audible device for playing out audible messages. In addition, the processor 508 preferably instructs the information interface 518 to automatically present the user of the communication device 500 with at least a visual indication (e.g., an icon or an icon in combination with a periodic chime) that informs the user that information is stored in the memory 512.

Operation of the wide area communication system 100 and the second wide area communication system 200 of FIGS. 1 and 2 occurs substantially as follows in accordance with the present invention. The localized information 410 and the individualized information 418 of FIG. 4 are conveyed to the plurality of communication devices 114–119 of FIG. 1 (or alternatively the second plurality of communication devices 214–217 of FIG. 2) according to a predetermined allocation or assignment of time intervals (e.g., the plurality of synchronous transmission frames 402, 403 of FIG. 4). In the preferred embodiment, the synchronous transmission frame 402 (e.g., the transmission frames F0–F2) in each periodic cycle of transmission frames are assigned for transmission of the localized information 410 and the remaining transmission frames 403 (e.g., frames F3–F127) in each periodic cycle of transmission frames are assigned for transmission of the individualized information 418. The synchronous transmission frame 402 assigned for transmission of the localized information 410 is effectively assigned to the local coverage areas (e.g., the plurality of local coverage areas 110–112 of FIG. 1 and the second plurality of local coverage areas 219–225 of FIG. 2).

Communication devices (e.g., the plurality of communication devices 114–119 of FIG. 1 and the second plurality of communication devices 214–217 of FIG. 2) subscribing to receive the localized information 410 are programmed with the broadcast address 406 (in order to receive the localized information 410) and further are programmed with the individual address 414 and/or a talkgroup address (in order to receive the individualized information 418). For example, when transmission frame F0 is assigned to provide the localized information 410 relating to the local coverage area 110, frame F0 is effectively assigned to the local coverage area 110. Accordingly, the plurality of broadcast transmission sites 103–105 serving the local coverage area 110 are programmed to transmit the signal 318 (as shown in FIG. 3) including the localized information 410 received from a local information source (not shown), such as a local news service, throughout the local coverage area 110 during transmission frame F0 only. As noted above, transmission frame F0 repeats each periodic cycle; therefore, the plurality of broadcast transmission sites 103–105 serving the local coverage area 110 preferably transmit signals such as the signal 318 including the localized information 410 relating to the local coverage area 110 periodically during transmission frame F0. In some instances, the localized information 410 can not be provided to the plurality of broadcast transmission sites 103–105 for transmission during each repeating cycle of the assigned transmission frame (e.g., the plurality of broadcast transmission sites 103–105 can not have the localized information 410 to transmit every four minutes when transmission frame F0 is scheduled for transmission). In these instances, the system controller (not shown) or an equivalent controller can perform a temporary reassignment or reallocation of the localized information transmission frames for the transmission of individualized information 418. Upon reassignment or reallocation, the plurality of broadcast transmission sites 103–105 preferably use the time intervals assigned for transmission of the localized information 410 to transmit the individualized information 418 during periods when no localized information 410 is to be transmitted.

Figure 6:
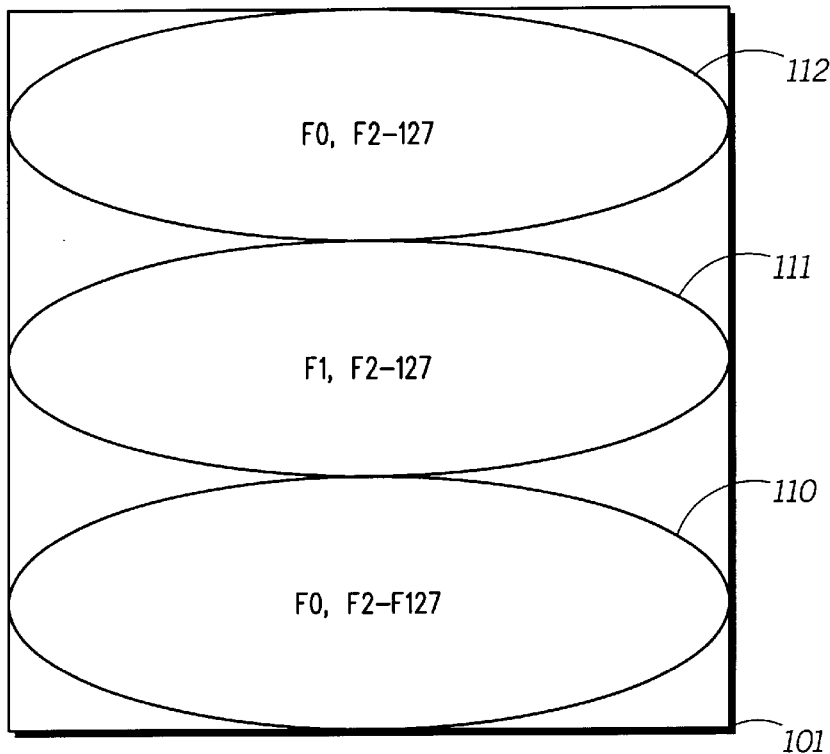
FIG. 6 is a diagram depicting transmission frame assignments in the communication system of FIG. 1 in accordance with a preferred embodiment of the present invention.

In the preferred embodiment, the time intervals assigned for transmission of the localized information 410 are reused throughout the wide area communication system 100 and the second wide area communication system 200 to make more efficient use of system resources. Accordingly, each time interval assigned for transmission of the localized information 410 is assigned to multiple local coverage areas. For example, as illustrated in FIG. 6, the transmission frame F0 can be assigned or reserved for the transmission of the localized information 410 in the local coverage areas 110 and 112, while the transmission frame F1 can be reserved for the transmission of the localized information 410 in the local coverage area 111. Transmission frames F2–F127 in this example are allocated to the transmission of the individualized information 418 in all the local coverage areas 110–112 of the wide area communication system 100. Therefore, in accordance with the transmission frame assignment of FIG. 6 and referring the FIG. 1, the plurality of broadcast transmission sites 103–105 and 107–108 in the local coverage areas 110 and 112 are programmed to transmit signals including the localized information 410 during transmission frame F0 and signals including the individualized information 418 during transmission frames F2–F127. Similarly, the broadcast transmission site 106 or sites in the local coverage area 111 are programmed to transmit signals including the localized information 410 during transmission frame F1 and signals including the individualized information 418 during transmission frames F2–F127. Therefore, in accordance with the transmission frame assignment of FIG. 6, transmission frames F0 and F1 form a group of transmission frames that are dedicated to the transmission of the localized information 410 and transmission frames F2–F127 form a group of transmission frames that are dedicated to the transmission of the individualized information 418 (e.g., individual pages). The reuse pattern selected for the time intervals assigned for the transmission of the localized information 410 is dependent upon the particular system configuration (e.g., local coverage area geometries, broadcast site antenna arrangements, local coverage area sizes, broadcast site effective radiated power levels, communication device receiver sensitivities, utilization of error correction, and so forth). In a preferred embodiment, the local coverage areas 110 and 112 using the same time interval (e.g., transmission frame F0) for transmission of the localized information 410 are located a sufficient distance apart to enable the communication devices 114, 115, 118, 119 in either of the local coverage areas 110 or 112 to properly receive signals including the localized information 410 relating to their particular local coverage area (110 or 112) without substantial interference from signals simultaneously transmitted from the broadcast transmission sites in the other local coverage area (112 or 110). The actual quantity of time intervals assigned for the transmission of the localized information 410 is dependent upon the reuse pattern. The transmission frame allocation depicted in FIG. 6 employs a reuse pattern of two and utilizes only two transmission frames for the transmission of the localized information 410.

It should be noted that the localized information 410 transmitted in each of the local coverage areas 110–112 relates to the particular local coverage area 110–112 and is not system wide in scope. For example, during transmission frame F0, the plurality of broadcast transmission sites 103–105 serving the local coverage area 110 can transmit local weather information pertaining to the geographic area embodied within the local coverage area 110, while during the same transmission frame, the broadcast transmission sites 107–108 serving the local coverage area 112 can transmit local traffic information pertaining to the roadways located within local coverage area 112.

In the preferred embodiment, the plurality of broadcast transmission sites 103–105 and 107–108 in the local coverage areas 110 and 112 are further programmed to disable their respective transmitters such as the transmitter 302 during the transmission frames assigned generally for the transmission of the localized information 410, but not assigned for transmission of the localized information 410 in the local coverage area served by the particular broadcast transmission site. For example, referring again to FIG. 6, during the transmission frame F0, the plurality of broadcast transmission sites 103–105 and 107–108 serving the local coverage areas 110 and 112 transmit the localized information 410 relating to their respective local coverage areas 110 and 112. During the same transmission frame (i.e., frame F0), the broadcast site 106 serving the local coverage area 111 disables its transmitter. Similarly, during transmission frame F1, the broadcast transmission site 106 serving the local coverage area 111 transmits the localized information 410 relating to its respective local coverage area 111, while the plurality of broadcast transmission sites 103–105 and 107–108 serving the local coverage areas 110 and 112 disable their respective transmitters. The disabling of the broadcast transmission site transmitters in such a manner reduces the level of interference present during transmission of the localized information 410, thereby improving the quality of transmitted signals including the localized information 410, especially when, as in most wide area paging systems, the carrier frequency used to transmit the localized information 410 in adjacent local coverage areas is the same.

Figure 7:
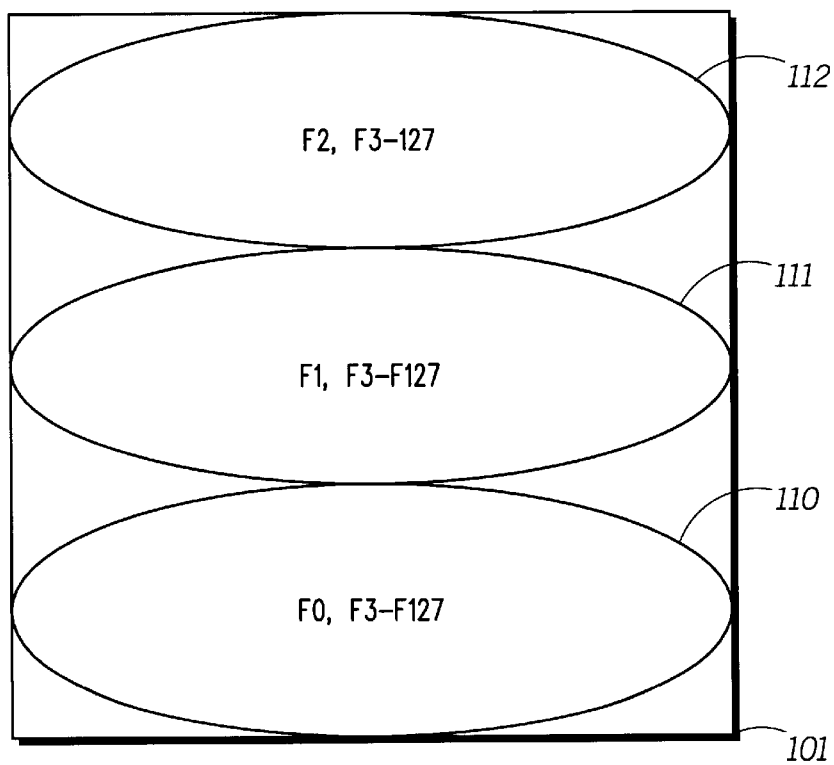
FIG. 7 is a diagram depicting transmission frame assignments in the communication system of FIG. 1 in accordance with an alternative embodiment of the present invention.

Although the reuse of time intervals assigned for the transmission of the localized information 410 is preferred, the present invention is also applicable to the assignment of unique time intervals for the transmission of the localized information 410 in each of the local coverage areas 110–112. For example, as illustrated in FIG. 7, and with reference to FIG. 1, all three of the local coverage areas 110–112 constituting the wide geographic area 101 of the wide area communication system 100 have been assigned unique transmission frames for the transmission of their respective localized information 410. Consequently, in accordance with FIG. 7, the plurality of broadcast transmission sites 103–105 serving the local coverage area 110 transmit the localized information 410 pertaining to the local coverage area 110 during transmission frame F0 and transmit individualized information 418 intended for particular communication devices during transmission frames F3–F127. Similarly, the broadcast transmission site 106 serving the local coverage area 111 transmits the localized information 410 pertaining to local coverage area 111 during transmission frame F1 and transmits individualized information 418 intended for particular communication devices during the transmission frames F3–F127. Lastly, the broadcast transmission sites 107–108 serving local coverage area 112 transmit the localized information 410 pertaining to local coverage area 112 during transmission frame F2 and transmit individualized information 418 intended for particular communication devices during transmission frames F3–F127.

After being powered on by its user, each of the plurality of communication devices 114–119 depicted in FIG. 1 synchronizes itself with the communication protocol 400 of the wide area communication system 100 in accordance with known techniques and begins monitoring an outbound (broadcast site-to-communication device) resource or channel such as one of the plurality of wireless communication resources 125–127 for the signal 318 including the individual address 414 or the broadcast address 406 stored in the plurality of communication devices 114–119. The outbound channel such as one of the plurality of wireless communication resources 125–127 can comprise a traffic channel in a paging system or a control channel in a cellular or two-way radio system. In accordance with a preferred embodiment in which time intervals assigned for transmission of the localized information 410 are reused throughout the wide area communication system 100, the plurality of communication devices 114–119 are all programmed to include the individual address 414 and each of the plurality of communication devices 114–119 subscribing to one or more localized information services is programmed to include the broadcast address 406 for each localized information service. The broadcast address 406 for each localized service in this embodiment preferably remains the same for transmissions in each of the local coverage areas 110–112.

Referring to FIGS. 1 and 5, upon detecting the individual address 414 in the signal 318 transmitted by any one of the plurality of broadcast transmission sites 103–108 serving the wide geographic area 101 of the wide area communication system 100, the communication device 500 stores the individualized information 418 accompanying the individual address 414 in a memory location (e.g., the memory location 521) and preferably alerts a user of the communication device 500 that a message has been received. In a preferred embodiment of a wide area communication system, all of the plurality of broadcast transmission sites 103–108 in the wide area communication system 100 simultaneously transmit (i.e., simulcast) individual messages to the plurality of communication devices 114–119 under the control of a controller (not shown) in accordance with known techniques.

Upon detecting the broadcast address 406 in the signal 318 transmitted by a broadcast site (e.g., site 105) that matches a broadcast address stored in the communication device 500, the communication device 500 either stores the localized information 410 accompanying the broadcast address 406 or discards it depending on the quality of the signal 318. In addition, upon storing the localized information 410, the communication device 500 preferably alerts the user of its receipt of new localized information 410 using the alerting device 516, and/or displays a visual indication (e.g., a localized information icon) on the information interface 518. A unique indication can be used for each local service or, in communication devices having substantial memory limitations; a single indication can be used for all local services.

In a preferred embodiment, all the localized information 410 accompanying the broadcast address 406 that matches a broadcast address stored in the communication device 500 is stored in the memory 512. However, in the event that the communication device 500 has substantial memory limitations, the communication device 500 preferably stores received localized information in a single memory location (e.g., the memory location 520). In this case, the communication device 500 stores selected subsequently received localized information in the memory location 520, such that the selected subsequently received localized information overwrites or replaces at least a portion of the previously stored localized information. When the selected subsequently received localized information is identical in size (e.g., has the same number of bits or bytes) to the previously stored localized information, the selected subsequently received localized information preferably replaces all of the previously stored localized information.

To determine or select which subsequently received localized information to store in the case of a memory-limited communication device, the communication device 500, in one embodiment, stores new localized information in the memory location 520 as it receives it, such that the most recently received localized information is stored in the memory location 520. When the wide area communication system 100 employs the communication protocol 400 of FIG. 4 and the communication device 500 is located within the local coverage area 110, but not in overlap area 123, the communication device 500, upon occasionally or periodically receiving the localized information 410 in transmission frame F0 (assuming localized information time interval reuse as in FIG. 6), stores the localized information 410 in the memory location 520 replacing at least a portion of the previously stored localized information. In the event that the communication device 500 is in an overlap area, such as the communication device 118 is depicted as being located in the overlap area 121 in FIG. 1, the communication device 118 stores the localized information 410 as the communication device 118 receives it in various time intervals. For example, in the event that the communication device 118 receives the localized information 410 relating to local coverage area 111 that was transmitted in transmission frame F1 after receiving and storing the localized information 410 relating to local coverage area 112 that was transmitted in transmission frame F0, the communication device 118 stores the localized information 410 relating to local coverage area 111 in the memory location 520, thereby replacing at least a portion of the localized information 410 relating to local coverage area 112.

In an alternative embodiment, the selection of which subsequently received localized information to store in the case of a memory-limited communication device is based on the received signal quality of the signal 318 transmitted by the plurality of broadcast transmission sites to convey the localized information 410. In this embodiment, the communication device 500 determines a quality characteristic, such as a received signal strength indication (RSSI), a bit error rate (BER), a word error rate, a signal-to-noise ratio, a carrier-to-interference plus noise ratio, or any other known signal quality metric, of the signal 318 received by the communication device 500 including the localized information 410 and the broadcast address 406 that coincides with a broadcast address stored in the communication device 500. The communication device 500 then compares the quality characteristic of the newly received localized information-bearing signal such as the signal 318 to the quality characteristic of the signal including the previously stored localized information. When the quality characteristic of the newly received localized information-bearing signal such as the signal 318 indicates a higher signal quality than the quality characteristic of the signal 318 including the previously stored localized information, then the communication device 500 stores the newly received localized information 410. On the other hand, when the quality characteristic of the signal 318 including the previously stored localized information indicates a higher signal quality than the quality characteristic of the newly received localized information-bearing signal, then the communication device 500 discards the newly received localized information and retains the previously stored localized information in the memory location 520.

This alternative embodiment is most applicable when the communication device is located in the overlap area 121 such as the communication device 118 and receives the localized information 410 during two time intervals of a periodically repeating transmission cycle of time intervals. For example, when the communication device 118 is in the overlap area 121 and receives the localized information 410 relating to local coverage area 112 during transmission frame F0 and then receives the localized information 410 relating to local coverage area 111 during transmission frame F1, the communication device 118 must determine which information to retain. To make such a determination, the communication device 118 compares the quality characteristics of the signals 318 used to convey the localized information 410 and stores the localized information 410 associated with the higher quality signal such as the signal 318.

In the preferred embodiment, the communication device 500 utilizes an algorithm for selecting the localized information 410 to store or retain that includes aspects of both of the above-described selection embodiments. In the preferred embodiment, the communication device 500 determines a quality characteristic of each localized information-bearing signal it receives that also bears the broadcast address 406 coinciding with a broadcast address stored in the communication device 500. When the received localized information 410 was transmitted in transmission frames of different transmission cycles (e.g., frame F0 of cycle N and frame F1 of cycle N+1), the communication device 500 stores the most recently received localized information 410 (e.g., information in frame F1 of cycle N+1), replacing the previously stored localized information (e.g., information in frame F0 of cycle N) or at least part of the previously stored localized information. However, when the received localized information 410 was transmitted in transmission frames of the same transmission cycle (e.g., frame F0 of cycle N and frame F1 of cycle N), the communication device 500 compares the quality characteristics of the signal bearing the respective localized information, and stores or retains (if already stored) the localized information 410 associated with the higher quality signal. Receiving the localized information 410 that was transmitted multiple times during the same transmission cycle would be an indication that the communication device 500 is located in an overlap area 123 of two or more of the local coverage areas 110–111.

Figure 8:
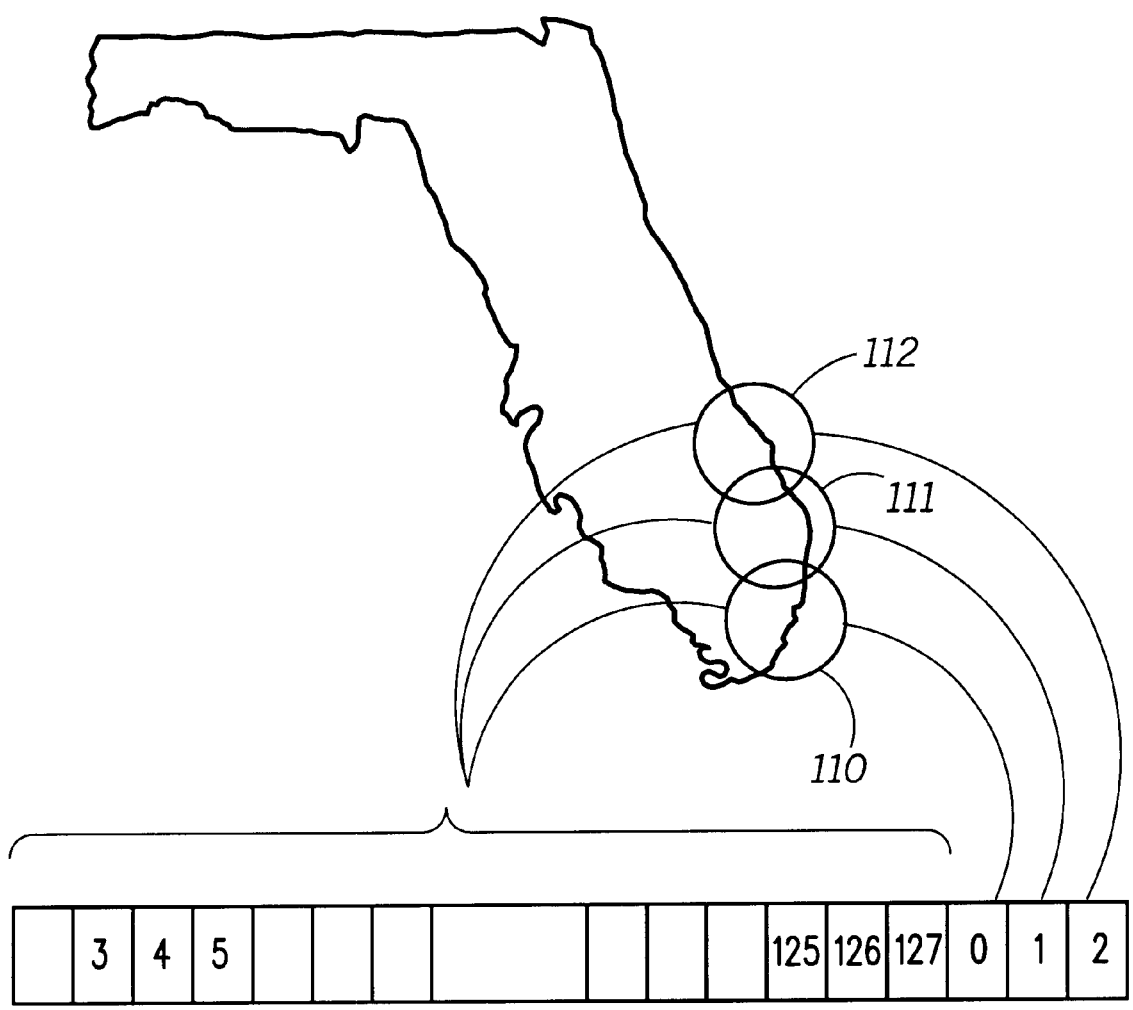
FIG. 8 illustrates an exemplary application of the communication system of FIG. 1 and the transmission frame assignments of FIG. 7 in accordance with the present invention.

A practical example of providing the localized information 410 and the individualized information 418 to communication devices located in the local coverage areas 110–112 is illustrated in FIG. 8. In FIG. 8, the local coverage area 110 effectively corresponds to Dade County, Fla., local coverage area 111 effectively corresponds to Broward County, Fla., and local coverage area 112 effectively corresponds to Palm Beach County, Fla. In accordance with the embodiment of the invention described above with respect to FIGS. 1 and 8, transmission frame F0 is assigned for the transmission of the localized information 410 in Dade County, transmission frame F1 is assigned for the transmission of the localized information 410 in Broward County, transmission frame F2 is assigned for the transmission of the localized information 410 in Palm Beach County, and transmission frames F3–F127 are assigned for the transmission of individualized information 418 in all three counties. Thus, in accordance with this embodiment, the plurality of broadcast transmission sites 103–105 in Dade County transmit the localized information 410 relating to Dade County during transmission frame F0, disable their transmitters such as the transmitter 302 at least during transmission frame F1 and preferably during both transmission frames F1 and F2, and transmit individualized information 418 intended for specific communication devices during transmission frames F3–F127. The broadcast transmission site 106 or sites in Broward County transmit the localized information 410 relating to Broward County during transmission frame F1, disable its or their transmitters such as the transmitter 302 during transmission frames F0 and F2, and transmit individualized information 418 intended for specific communication devices during transmission frames F3–F127. The broadcast transmission sites 107–108 in Palm Beach County transmit the localized information 410 relating to Palm Beach County during transmission frame F2, disable their transmitters such as the transmitter 302 during transmission frames F0 and F1, and transmit individualized information 418 intended for specific communication devices during transmission frames F3–F127. The plurality of communication devices 114–119 operating in all three counties receive and store the localized information 410 and the individualized information 418 as discussed above.

Figure 9:
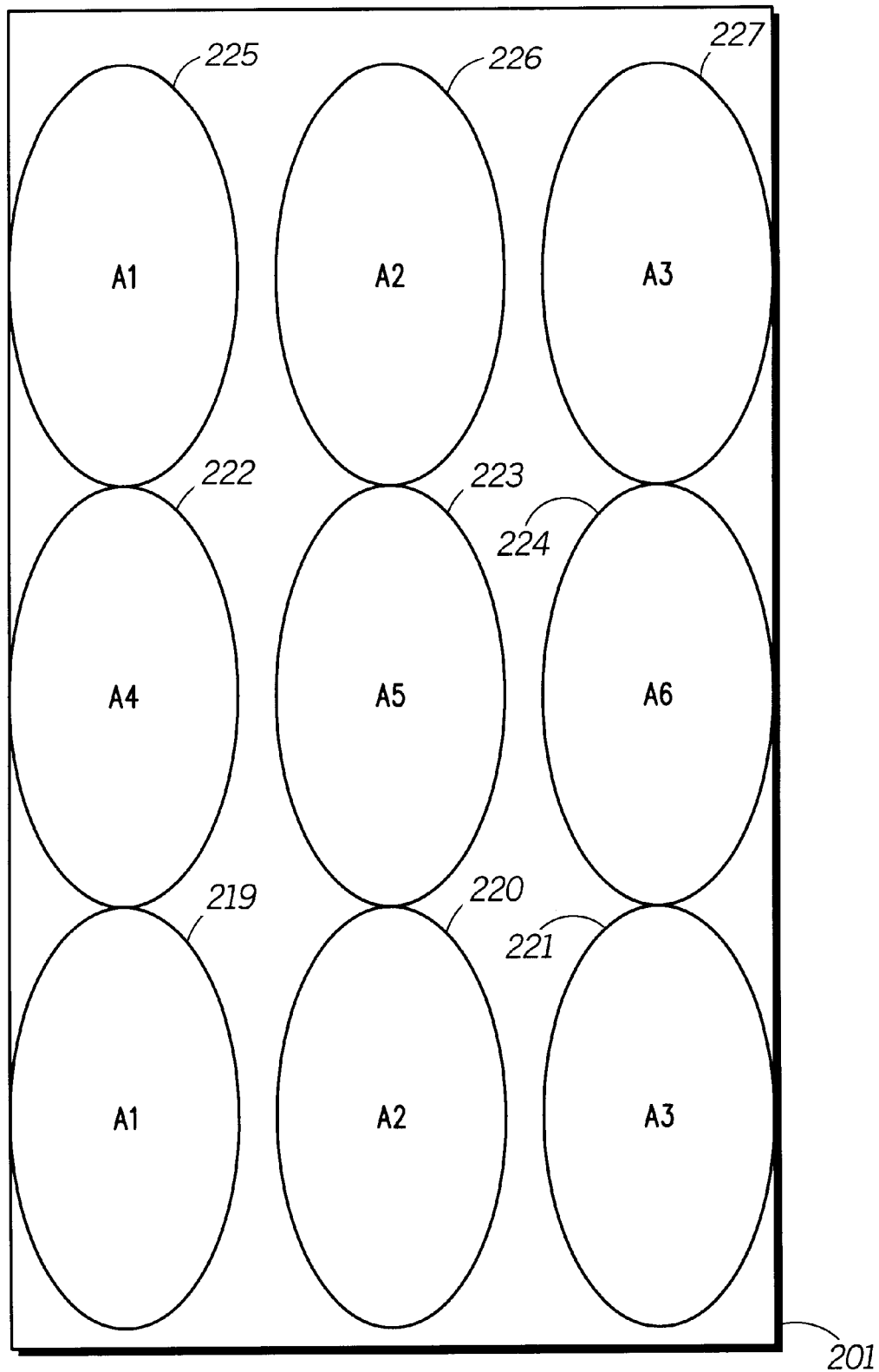
FIG. 9 is a diagram depicting address assignments in the communication system of FIG. 2 in accordance with one embodiment of the present invention.
Figure 10:
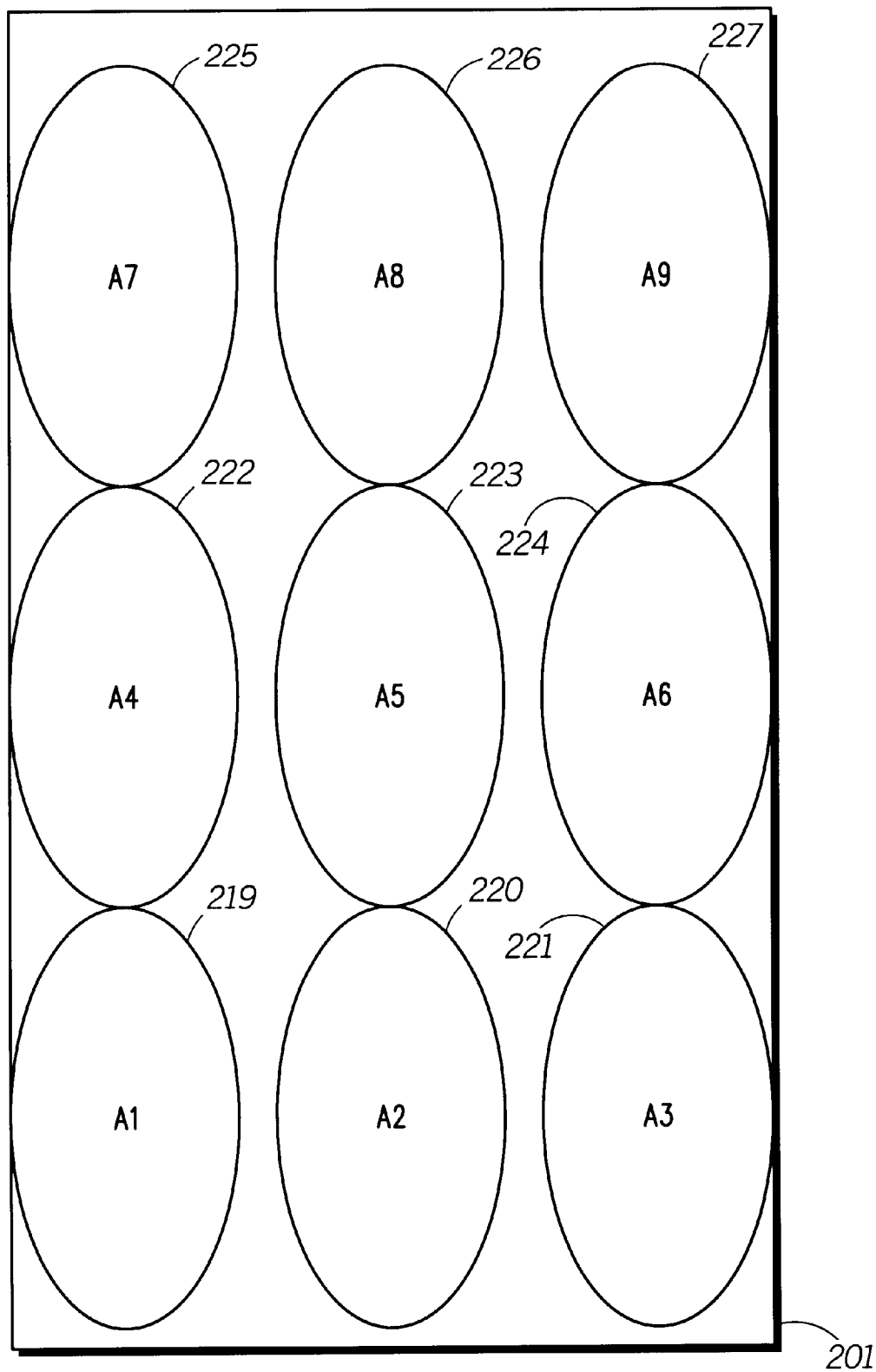
FIG. 10 is a diagram depicting address assignments in the communication system of FIG. 2 in accordance with an alternate embodiment of the present invention.

Referring now to FIGS. 2, 4, 9, and 10, the localized information 410 is alternatively conveyed to the second plurality of communication devices 214–217 according to a predetermined allocation or assignment of dedicated broadcast addresses. That is, instead of assigning time intervals to local coverage areas to facilitate the orderly, efficient transmission of localized information, the broadcast addresses are assigned to the local coverage areas to facilitate transmission of the localized information during any time interval. The broadcast addresses are preferably assigned as illustrated in FIG. 9. That is, similar to the preferred reuse of time intervals described above with respect to FIG. 6, a group of broadcast addresses dedicated to providing local information are preferably reused throughout the second wide area communication system 200 to facilitate transmissions of the localized information 410 without requiring the second plurality of communication devices 214–217 to store large quantities of broadcast addresses. For example, as depicted in FIG. 9, the broadcast address A1 is assigned for the transmission of the localized information 410 in the local coverage areas 219 and 225, the broadcast address A2 is assigned for the transmission of the localized information 410 in the local coverage areas 220 and 226, and the broadcast address A3 is assigned for the transmission of the localized information 410 in local coverage areas 221 and 227. Broadcast addresses A4–A6 are assigned respectively for transmission of the localized information 410 in the local coverage areas 222–224. The local coverage areas that reuse the broadcast addresses are selected to preferably be sufficient distances from each other to enable a communication device in a particular one of the local coverage areas to receive the signal 318 including the localized information 410 relating to the particular local coverage area without incurring substantial interference from localized information transmissions in the other local coverage areas sharing the same broadcast address. The amount of acceptable interference and, therefore, the distance between local coverage areas using the same broadcast address can vary depending upon system configuration and performance requirements.

For a communication device to obtain the localized information 410 in accordance with the embodiment of the invention illustrated in FIGS. 2 and 9, the communication device (e.g., the communication device 500) is programmed with its individual address and a group of broadcast addresses for each broadcast service (e.g., local news service, local traffic service, local weather service, local stock update, and so forth). The group of addresses illustrated in FIG. 9 would be for one particular broadcast service. To provide the localized information 410 relating to the local coverage area 219 to the communication device 500, the broadcast transmission sites 203 and 204, under the control of a system controller (not shown), transmit the localized information 410 together with broadcast address A1 during a time interval (e.g., during any one of the transmission frames F0–F127 used in the communication protocol 400). Upon receiving the signal 318 including a broadcast address A1, the communication device 214 compares broadcast address A1 with the broadcast addresses stored in its memory 512. In the event that broadcast address A1 matches a stored broadcast address, the communication device 500 proceeds with receiving, processing, and preferably storing the accompanying localized information 410. In the event that the communication device 500 is a memory-limited device, the communication device 500 can store the localized information 410 in the memory location 520 of the communication device 500 reserved for localized information, thereby replacing at least a portion of previously stored localized information as discussed above with respect to FIGS. 1, 6, and 7. Alternatively or additionally, the communication device 500 can determine whether to replace currently stored localized information based on a comparison of received quality characteristics associated with the signals including the newly and previously received localized information as also discussed above with respect to FIGS. 1, 6 and 7.

To provide individualized information 418 to the communication device 500, the second plurality of broadcast transmission sites 203–205 serving at least two local coverage areas 219, 220 (preferably the second plurality of broadcast transmission sites 203–212 serving all of the plurality of local coverage areas 219–227 in a wide area communication system) simultaneously transmit the individualized information 418 together with the individual address 414 of the communication device 500 during a time interval (e.g., any one of the transmission frames F0–F127) in accordance with the communication protocol 400 of FIG. 4. Less than all the second plurality of broadcast transmission sites 203–212 can transmit the individualized information 418 in a cellular system or a two-way radio system that utilizes mobility management to track the location of the communication device 500 to a group of local coverage areas.

As described above, the present invention permits localized information to be conveyed efficiently to communication devices in a wide area communication system by allocating time intervals and/or broadcast addresses to the distribution of such localized information. In contrast to prior art systems that support only individual messaging and the broadcasting of national information, the present invention provides a unique approach for incorporating local information broadcasts into such systems without overwhelming the systems and introducing substantial delays into the transmissions of individual messages (as would be the case when local information were conveyed to each communication device on an individual basis). The present invention also provides a technique for storing received localized information in communication devices with substantial memory limitations to enable such communication devices to receive localized information services without substantially sacrificing individual message memory.

Figure 11:
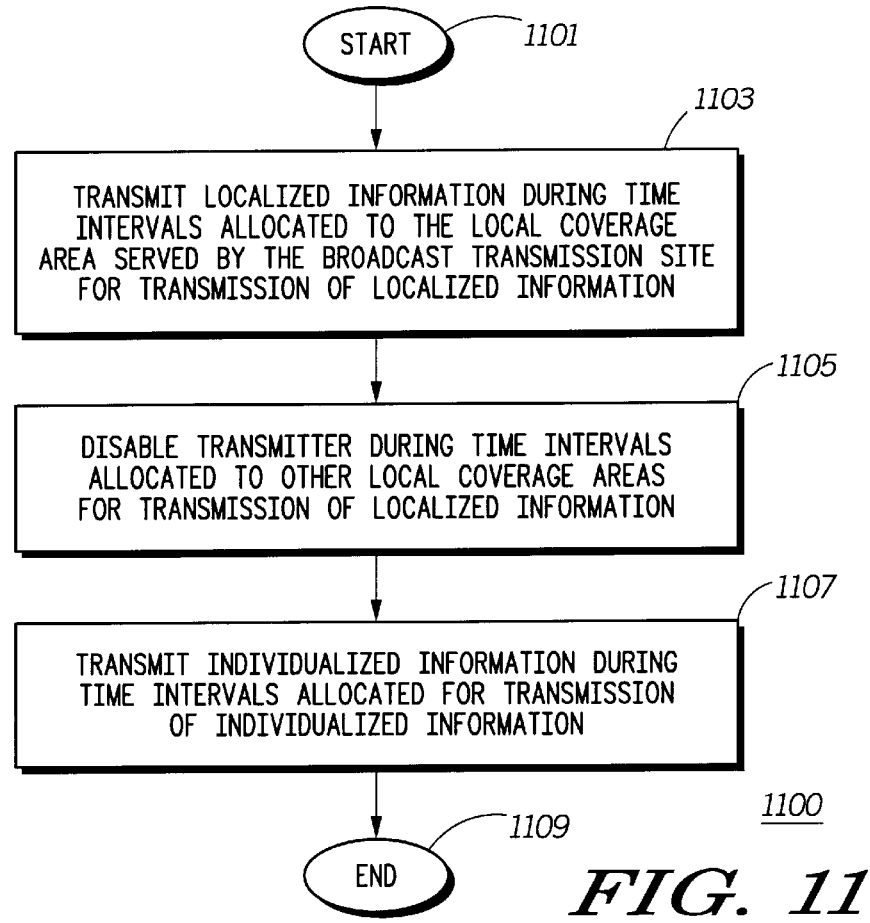
FIG. 11 illustrates a logic flow diagram of steps executed by a broadcast transmission site in accordance with a preferred embodiment of the present invention.

FIG. 11 illustrates a logic flow diagram 1100 of steps executed by the broadcast transmission site 300 in accordance with a preferred embodiment of the present invention. The steps of this logic flow diagram 1100 are preferably performed by hardware and software elements (e.g., the transmitter 302 and the controller 306) of the broadcast transmission site 300.

The logic flow begins (1101) when the broadcast transmission site 300 transmits (1103) the signal 318 including the localized information 410 during time intervals allocated to the local coverage area served by the broadcast transmission site 300 for transmission of the localized information 410. That is, the broadcast transmission site 300 receives the localized information 410, such as weather information, traffic information, local news information, and/or any other information pertinent to the local coverage area served by the broadcast transmission site 300, from one or more local information sources, such as a local news service or a local traffic and weather service, and stores the localized information temporarily in its memory. The broadcast transmission site 300, preferably being time synchronized with all the other broadcast transmission sites serving the wide area communication system that includes the local coverage area served by the broadcast transmission site 300, monitors the transmission time intervals (e.g., transmission frame times) of the outbound traffic channel or control channel (depending upon which channel will be used for transmission of the localized information) to determine when the next transmission time interval is a time interval previously allocated or assigned (e.g., by the system operator) for transmission of the broadcast transmission site's localized information.

Upon determining that a transmission time interval allocated for transmission of the broadcast transmission site's localized information is upcoming, the broadcast transmission site 300 retrieves the localized information 410 from memory and preferably prepends the broadcast address 406 or identification ID) to the information. The broadcast transmission site 300 then generates a signal that includes the composite information (the localized information 410 plus the broadcast address 406) for transmission in accordance with the transmission protocol of the wide area communication system or the transmission protocol of the local coverage area in the event that such protocol is different than the transmission protocol or protocols of the wide area system, and transmits (1103) the signal 318 including the composite information during the allocated time interval. As discussed above, the time interval for transmission of localized information can repeat periodically, for example, when a particular time interval of a periodic cycle of time intervals (e.g., a transmission frame of a periodic cycle of transmission frames) is allocated to the local coverage area served by the broadcast transmission site 300 or to a group of local coverage areas in accordance with a desired reuse pattern for transmission of the localized information.

During time intervals generally allocated for transmission of localized information, but not specifically allocated to the local coverage area served by the broadcast transmission site 300, the broadcast transmission site 300 disables (1105) its transmitter 302 to enable higher quality transmissions of the localized information in other local coverage areas. By disabling its transmitter 302 during such time intervals, the broadcast transmission site 300 substantially reduces the amount of interference it generates during time intervals allocated to other local coverage areas or groups of local coverage areas (e.g., when time intervals for localized transmissions are reused throughout the wide area system), thereby increasing the likelihood of higher quality transmissions in those other local coverage areas.

During time intervals allocated for the transmission of the individualized information 418 throughout the wide area communication system (e.g., during time intervals allocated for simulcast paging to individual pagers), the broadcast transmission site 300 transmits (1107) signals including such individualized information 418 after such individualized information 418 has been received from an information source, such as the public switched telephone network, a system controller, a paging controller, a base site controller, and/or a short message service provider. Thus, after the broadcast transmission site 300 receives information intended for an individual communication device or a specific group of communication devices (e.g., a talkgroup in a two-way radio system), the broadcast transmission site 300 stores the information for transmission during time intervals allocated for transmission of the individualized information 418.

Upon determining that a transmission time interval allocated for transmission of the individualized information 418 is upcoming, the broadcast transmission site 300 retrieves the individualized information 418 from memory and preferably prepends an individual or talkgroup address or ID to the information. The broadcast transmission site 300 then generates a signal that includes the composite information (the individualized information 418 plus the individual address 414) for transmission in accordance with the transmission protocol of the wide area communication system or the transmission protocol of the local coverage area in the event that such protocol is different than the transmission protocol or protocols of the wide area system, and transmits (1107) the signal including the composite information during the allocated time interval. As discussed above, the time interval or intervals for transmission of the individualized information 418 can repeat periodically, for example, when a group of time intervals of a periodic cycle of time intervals (e.g., a group of transmission frames of a periodic cycle of transmission frames) is allocated to the transmission of the individualized information 418. For example, in a wide area simulcast messaging system, the broadcast transmission site transmits individual messages (data or voice messages) simultaneously with every other broadcast transmission site in the wide area system during the periodic time intervals allocated for such messages by a messaging controller. Next, the logic flow ends (1109).

Figure 12:
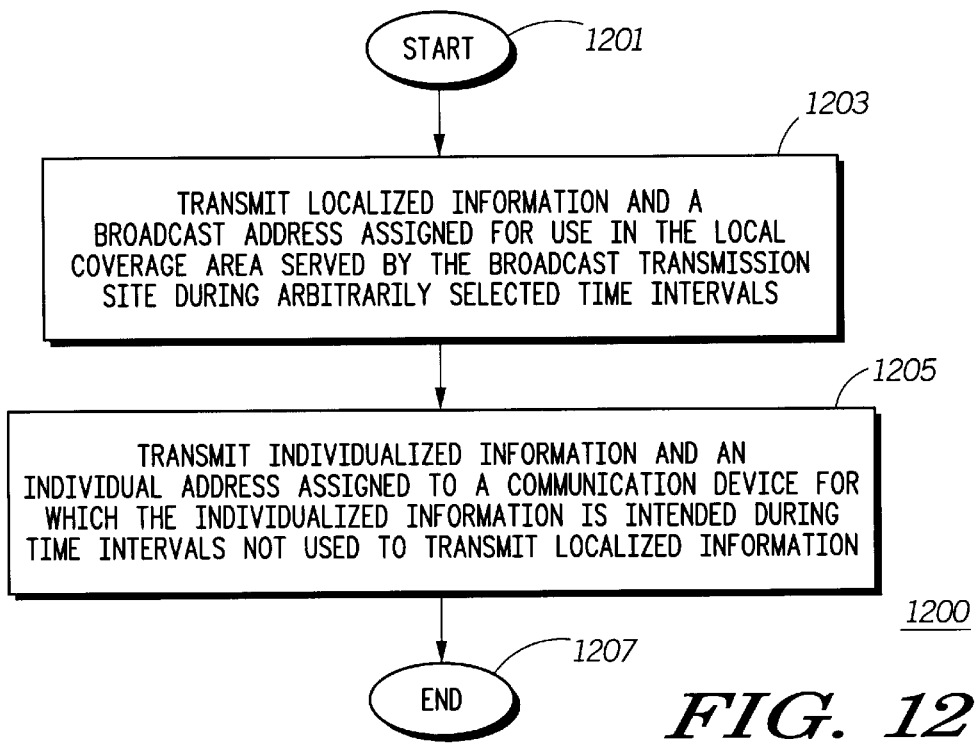
FIG. 12 illustrates a logic flow diagram of steps executed by a broadcast transmission site in accordance with an alternative embodiment of the present invention.

FIG. 12 illustrates a logic flow diagram 1200 of steps executed by the broadcast transmission site 300 in accordance with an alternative embodiment of the present invention. Similar to FIG. 11, the steps of this logic flow diagram 1200 are preferably performed by hardware and software elements (e.g., the transmitter 302 and the controller 306) of the broadcast transmission site 300.

The logic flow begins (1201) when the broadcast transmission site 300 transmits (1203), during arbitrarily selected time intervals, signals including the localized information 410 and the broadcast address 406 assigned for use in the local coverage area served by the broadcast transmission site 300. The broadcast address 406 can be unique to the local coverage area or unique to a group of local coverage areas based on a desired broadcast address reuse pattern. In this embodiment, upon receiving information pertaining to the broadcast transmission site's local coverage area from a local information source, the broadcast transmission site 300 preferably prepends the broadcast address 406 assigned for use in the local coverage area to the localized information 410, generates a signal including the localized information 410 and the broadcast address 406, and transmits (1203) the signal preferably during the next available time interval (e.g., transmission frame). Alternatively, the broadcast transmission site 300 can store the received information for later generation and transmission of the signal including the localized information 410 (e.g., such that localized information 410 is broadcast at least once every one-half hour even though it can be received more frequently).

During time intervals not used for transmission of the localized information 410, the broadcast transmission site 300 transmits (1205) signals including the individualized information 418 and the individual address 414 or ID assigned to the communication device for which the individualized information 418 is intended and the logic flow ends (1207). Thus, in contrast to the embodiment described above with respect to FIG. 11, which provides for time dependent and broadcast address independent distribution of the localized information 410, this embodiment provides for time independent and broadcast address dependent distribution of the localized information 410. In this embodiment, signals including the individualized information 418 are transmitted during time intervals that are not used to transmit the localized information 410, but there are no pre-assigned intervals for each type (localized or individualized) of information. In the embodiment of FIG. 11, the individualized information 418 is transmitted during time intervals that are not used to transmit the localized information 410; however, there are dedicated time intervals (e.g., transmission frames) for each type of information.

Figure 13:
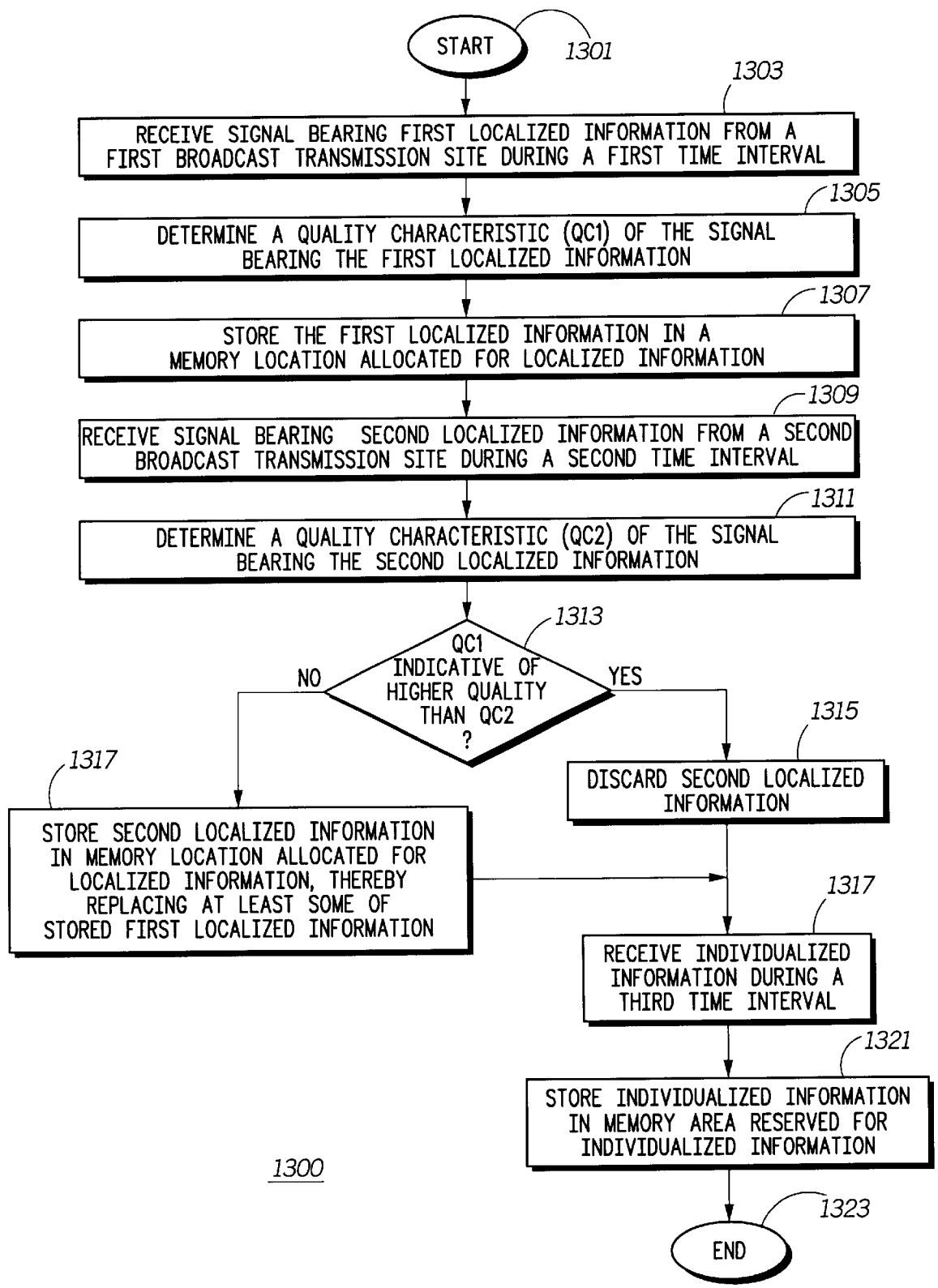
FIG. 13 illustrates a logic flow diagram of steps executed by a communication device in accordance with a first exemplary embodiment of the present invention.

FIG. 13 illustrates a logic flow diagram 1300 of steps executed by a communication device in accordance with a first exemplary embodiment of the present invention. The steps of this logic flow diagram 1300 are preferably performed by hardware and software elements (e.g., device receiver, processor, and memory) of the communication device.

The logic flow begins (1301) when the communication device receives (1303) a signal including a first localized information from a first broadcast transmission site during a first time interval. The first localized information can comprise local news, local weather, local traffic, and/or any other information of importance primarily within the local coverage area served by the first broadcast transmission site. The communication device then determines (1305) a quality characteristic, such as received signal strength, bit error rate, signal-to-noise ratio, or carrier-to-interference plus noise ratio, of the signal including the first localized information and stores (1307) the first localized information in a memory location allocated for localized information. As discussed above, the communication device preferably includes separate memory locations (e.g., registers or groups of registers) for localized information and for individualized information. The communication device also preferably stores the computed or measured quality characteristic for later use.

Some time after receipt of the signal including the first localized information, the communication device receives (1309) a signal including a second localized information from a second broadcast transmission site during a second time interval (e.g., the time interval immediately following the time interval containing the signal including the first localized information or some other time interval allocated for transmission of localized information from broadcast transmission sites other than the first broadcast transmission site). In this embodiment, the communication device can be located in an overlap area forming part of both the local coverage area served by the first broadcast transmission site and the local coverage area served by the second broadcast transmission site. Therefore, when one time interval is allocated for transmission of localized information in the local coverage area served by the first broadcast transmission site and another later time interval is allocated for transmission of localized information in the local coverage area served by the second broadcast transmission site, the communication device will likely receive both transmissions during different time intervals.

Upon receiving the second localized information, the communication device determines (1311) a quality characteristic of the signal including the second localized information and compares the quality characteristic to the stored quality characteristic of the signal including the first localized information to determine (1313) which of the two quality characteristics is indicative of higher signal quality. For example, when the two quality characteristics were signal-to-noise ratios, the higher signal-to-noise ratio would be indicative of higher signal quality. By contrast, when the two quality characteristics were bit error rates, the lower bit error rate would be indicative of higher signal quality.

When the quality characteristic of the signal including the second localized information is indicative of higher quality than the stored quality characteristic of the signal including the first localized information, the communication device stores (1317) the second localized information in the memory location reserved or allocated for localized information for later retrieval by, and/or display to, the user of the communication device. In the preferred embodiment, when the second localized information is stored in memory, it replaces at least some of (and preferably all when the quantity of bits or bytes in the second localized information is greater than or equal to the quantity of bits or bytes in the first localized information) the stored first localized information. When the stored quality characteristic of the signal including the first localized information is indicative of higher quality than the quality characteristic of the signal including the second localized information, the communication device discards (1315) the second localized information and retains the first localized information in memory for retrieval by the user of the communication device.

Therefore, in blocks 1313, 1315, and 1317, the communication device determines which local coverage area the communication device belongs to and retains only localized information relating to such local coverage area. When the communication device decides to retain the more recently received information (i.e., the second localized information), the communication device preferably replaces the stored information with the new information to enable the communication device to preferably include only one memory location for all received localized information. Reservation or allocation of a minimal number of memory locations for localized information is particularly desirable in communication devices that have small quantities of memory to enable such devices to accommodate receipt and storage of both local messages and individual messages.

In addition to receiving first and second localized information, the communication device receives (1319) individualized information during a third time interval. The third time interval can occur before, after, or between the first and second time intervals referred to in blocks 1303 and 1309 depending on the system operator's desired allocation of time intervals to localized and individualized information. Consequently, the receipt of the individualized information can occur before, after, or between receipt of the first localized information and the second localized broadcast information, notwithstanding FIG. 13's depiction of the individualized information being received by the communication device after receipt of the first and second localized information.

For example, in the preferred embodiment, the first three transmission frames (frames F0–F2) of a periodic cycle of one hundred twenty-eight (128) transmission frames employed pursuant to Motorola's "FLEX™" protocol are dedicated to the transmission of localized information and the remaining one hundred twenty-five (125) transmission frames (frames F3–F127) are dedicated to the transmission of individualized information. Alternatively, the first one hundred twenty-five (125) transmission frames (frames F0–F124) can be dedicated to the transmission of individualized information and the last three transmission frames (frames F125–F127) can be dedicated to the transmission of localized information. Still further, the first, third, and fifth transmission frames (frames F0, F2, and F4) can be dedicated to the transmission of localized information and the remaining one hundred twenty-five (125) transmission frames (frames F1, F3, and F5–F127) can be dedicated to the transmission of individualized information. Many other transmission frame allocations are possible as long as, pursuant to this embodiment, at least two transmission frames of each periodic cycle are allocated to the transmission of localized information.

After receiving the individualized information (e.g., a voice message, a short data message, an alpha-numeric page, or the like), the communication device stores (1321) the individualized information in a memory area reserved for the storage of individualized information, and the logic flow ends (1323). In the preferred embodiment, the memory area reserved for individualized information is substantially larger than the memory area reserved for localized information because the volume of individualized information likely to be received is substantially larger than the volume of localized information. Moreover, in contrast to localized information, individualized information is not updated over time and then would need to be retrieved by a user of the communication device at a time much later than when it was received by the communication device.

Although the description above with respect to FIG. 13 focused primarily on time interval dependent transmission of localized information, the use of signal quality characteristics as a basis for determining which received localized information to retain and the replacement of lower quality information with higher quality information is also applicable when, as described below with respect to FIG. 14, the transmission of localized information is broadcast address dependent and time interval independent. In such a case, the communication device determines that it received localized information based on receipt of a pre-assigned or pre-allocated broadcast address and then stores it and/or replaces it based on the signal quality characteristic of the signal including the localized information and the signal quality characteristic of a subsequently received signal including localized information that includes a different (or the same with respect to an update transmission) broadcast address.

Figure 14:
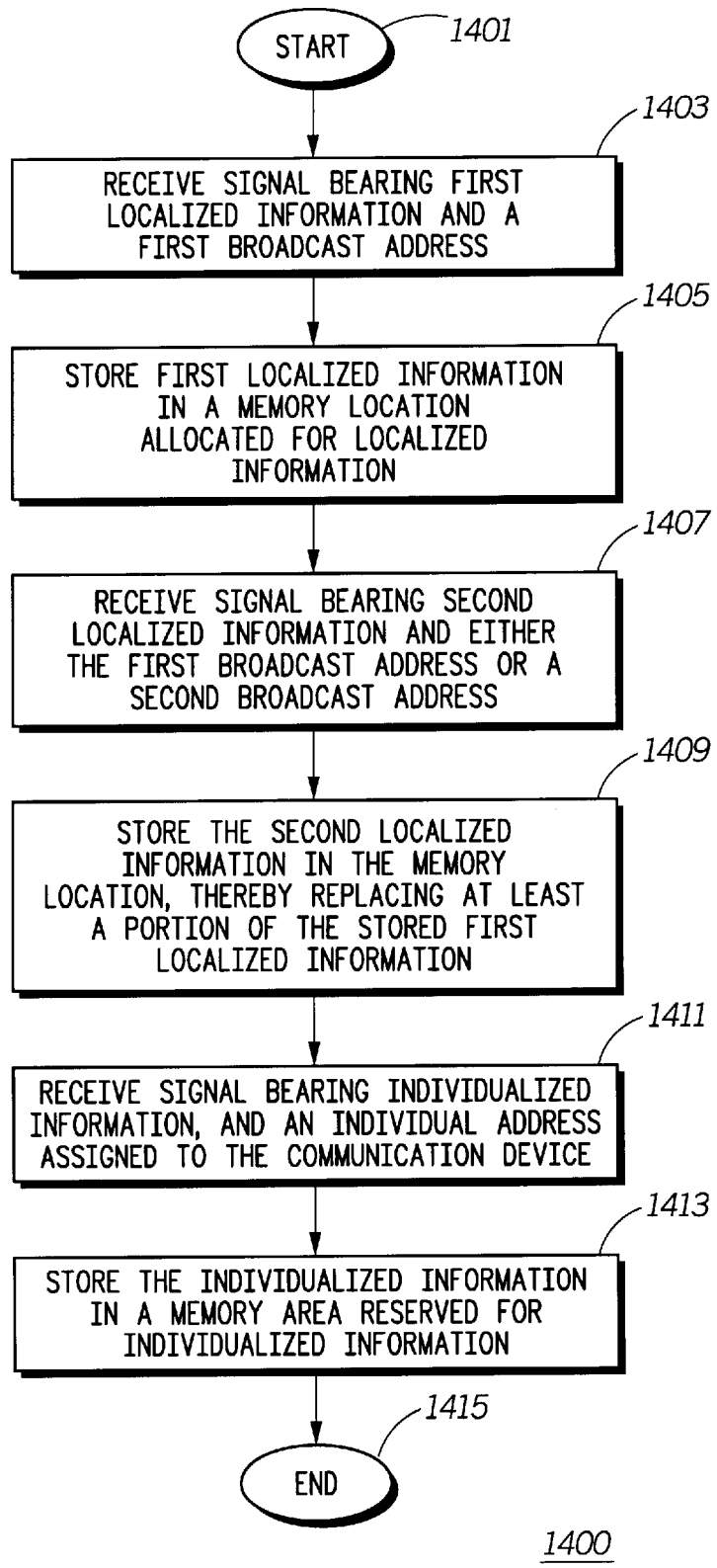
FIG. 14 illustrates a logic flow diagram of steps executed by a communication device in accordance with a second exemplary embodiment of the present invention.

FIG. 14 illustrates a logic flow diagram 1400 of steps executed by a communication device in accordance with a second exemplary embodiment of the present invention. Similar to FIG. 13, the steps of this logic flow diagram 1400 are preferably performed by hardware and software elements (e.g., receiver, processor, and memory) of the communication device. The logic flow begins (1401) when the communication device receives (1403) a signal including a first localized information and a first broadcast address. In this embodiment, the communication device is programmed to receive signals including the localized information and one or more broadcast addresses. Such programming can occur at the point of sale or service, or via over-the-air programming. The first localized information is transmitted from one or more broadcast transmission sites (e.g., base sites or cell sites) serving a first local coverage area in or near which the communication device is currently located. After receiving the first localized information, the communication device stores (1405) the received information for later retrieval in a memory location allocated for storage of localized information. As discussed above, in communication devices with small quantities of memory, minimal memory is preferably allocated for storage of localized information. For example, a single memory location (e.g., a single register) can be reserved for localized information in small pagers or cellular telephones.

During some later time interval, the communication device receives (1407) a signal including a second localized information and either the first broadcast address (in the case of a localized information update transmitted from one or more of the broadcast transmission sites serving the first local coverage area) or a second broadcast address (in the case where the communication device has moved into a second local coverage area or where the communication device is located in an overlap area forming part of both the first local coverage area and the second local coverage area). In either event, the communication device stores (1409) the second localized information in the memory location allocated for storage of localized information, thereby replacing at least a portion of (and preferably all when the quantity of bits or bytes in the second localized information is greater than or equal to the quantity of bits or bytes in the first localized information) the stored first localized information. In a preferred embodiment, such replacement occurs regardless of the type of localized information. For example, when local news information is currently stored in the memory location allocated for storage of localized information and the communication device receives local traffic information in block 1407, then the local traffic information overwrites or replaces some or all of the local news information. Thus, in a preferred embodiment, all broadcast addresses are mapped to a single memory location that is allocated for storage of localized information. To enable accurate retrieval of the newly received and stored information, the communication device software preferably employs a pointer to indicate the end of the newly stored information.

In contrast to the embodiment described above with respect to FIG. 13, the embodiment of FIG. 14 does not (although it could as discussed above) base the decision on whether or not to replace previously stored localized information on determined signal quality characteristics, but instead bases such decision on the timing of the received information. That is, in this embodiment, the communication device presumes that the most recently received localized information is the information that should be stored for later retrieval by the communication device user. Similar to the embodiment of FIG. 13, a communication device with a small quantity of memory overwrites or replaces some or all of the currently stored information with the new information.

In addition to receiving first and second localized information, the communication device receives (1411) a signal including an individualized information and an individual address assigned to the communication device. The receipt of the individualized information can occur before, after, or between receipt of the first localized information and the second localized information, notwithstanding FIG. 14's depiction of the individualized information being received by the communication device after receipt of the first and second localized information. That is, individualized information can be received during any time interval that does not include localized information. Upon receiving the individualized information, the communication device stores (1413) the individualized information in a memory area reserved for individualized information. In communication devices with a small quantity of memory for storing received messages or other information, the memory allocated or reserved for individualized information preferably substantially exceeds the memory allocated or reserved for localized information for the reasons detailed above.

The present invention encompasses a method and apparatus for providing localized and individualized information to a communication device that is located in a wide area communication system. With this invention, communication devices can be programmed to receive local information, as well as individual and national information, in contrast to prior art paging and digital cellular systems that provide individual and national information only. The present invention utilizes transmission time intervals and/or broadcast addresses as the triggers for indicating to the communication device when broadcast information is being transmitted.

In addition, the present invention incorporates time interval and/or broadcast address reuse to permit resource-efficient distribution of localized information. That is, by reusing time intervals dedicated to the transmission of localized information, fewer time intervals must be so dedicated to facilitate localized transmissions throughout a wide area communication system, thereby providing more time intervals for transmission of individualized information and enabling more subscribers to utilize the system for its primary purpose (i.e., the conveyance of individual messages). By alternatively or additionally reusing broadcast addresses, the communication device need not store as many broadcast addresses to be able to receive localized information as it travels throughout a wide area communication system, thereby leaving more memory available for other communication device functions, such as storing received individualized information. Prior art systems do not allocate time intervals or broadcast addresses on a local coverage area basis to facilitate the transmission of localized information and further do not provide for time interval and/or broadcast address reuse to more efficiently provide such local information to communication device users.

The present invention also takes into account memory limitations of small communication devices and provides a replacement algorithm for storing received localized information in such devices to enable such devices to receive localized services without substantially impacting their ability to receive and store individual messages.

While the foregoing constitute certain preferred and alternative embodiments of the present invention, it is to be understood that the invention is not limited thereto and that in light of the present disclosure, various other embodiments will be apparent to persons skilled in the art. Accordingly, it is to be recognized that changes can be made without departing from the scope of the invention as particularly pointed out and distinctly claimed in the appended claims which shall be construed to encompass all legal equivalents thereof.

What is claimed is:

1. In a wide area communication system that includes a plurality of broadcast transmission sites and a plurality of communication devices, the plurality of broadcast transmission sites providing at least one broadcast service to the plurality of communication devices throughout the wide area communication system, a method for providing localized information to at least one communication device of the plurality of communication devices that is located in a first local coverage area of a plurality of local coverage areas within the wide area communication system, the method comprising the steps of:

transmitting, by a first group of broadcast transmission sites during a first time interval, a first signal including a first localized information relating to the first local coverage area, the first group of broadcast transmission sites being a subset of the plurality of broadcast transmission sites and providing a first plurality of broadcast services to the first local coverage area; and transmitting, by the plurality of broadcast transmission sites during a second time interval, a second signal including an individualized information for the at least one communication device.

2. The method of claim 1, wherein the at least one communication device is located in a second local coverage area of the plurality of local coverage areas, the method further comprising the step of:

transmitting, by a second group of broadcast transmission sites during a third time interval, a third signal including a second localized information relating to the second local coverage area, the second group of broadcast transmission sites being a subset of the plurality of broadcast transmission sites and providing a second plurality of broadcast services to the second local coverage area.

3. The method of claim 2, further comprising the steps of:

receiving, by the at least one communication device, the first signal including the first localized information relating to the first local coverage area;

determining, by the at least one communication device, a first quality characteristic of the first signal including the first localized information relating to the first local coverage area to produce the first quality characteristic;

receiving, by the at least one communication device, the third signal including the second localized information relating to the second local coverage area;

determining, by the at least one communication device, a second quality characteristic of the third signal including the second localized information relating to the second local coverage area to produce the second quality characteristic;

comparing, by the at least one communication device, the first quality characteristic and the second quality characteristic;

storing, by the at least one communication device, the first localized information relating to the first local coverage area in a memory location of the at least one communication device when the first quality characteristic is a higher quality than the second quality characteristic; and storing, by the at least one communication device, the second localized information relating to the second local coverage area in the memory location of the at least one communication device when the second quality characteristic is a higher quality than the first quality characteristic.

4. The method of claim 2, wherein the first time interval and the third time interval are two transmission frames of a group of transmission frames that are dedicated to providing localized information to the plurality or communication devices, the group of transmission frames constituting a portion of a periodic transmission cycle of transmission frames.

5. The method of claim 1, further comprising the step of:

transmitting, by a second group of broadcast transmission sites during the first time interval, a third signal including a second localized information relating to a second local coverage area, the second group of broadcast transmission sites being a subset of the plurality of broadcast transmission sites and providing a second plurality of broadcast services to the second local coverage area, the second local coverage area being located sufficiently distant from the first local coverage area to enable a communication device of the plurality or communication devices that is located in the second local coverage area to receive the third signal including the second localized information transmitted from the second group of broadcast transmission sites without substantial interference from the first signal including the first localized information transmitted From the first group of broadcast transmission sites.

6. The method of claim 5, further comprising the step of:

disabling, by a third group of broadcast transmission sites of the plurality of broadcast transmission sites servicing local coverage areas other than the first local coverage area and the second local coverage area, a transmitter at each of the broadcast transmission sites of the third group of broadcast transmission sites during the first time interval.

7. The method of claim 1, further comprising the step of:

disabling a transmitter at each of a second group of broadcast transmission sites during the first time interval, the second group of broadcast transmission sites being a subset of the plurality of broadcast transmission sites and providing a second plurality of broadcast services to a second local coverage area that is substantially adjacent to the first local coverage area.

8. The method of claim 1, further comprising the step of assigning the at least one communication device a broadcast address and an individual address prior to the transmitting of the first signal step, wherein the first signal including the first localized information further comprises the broadcast address, and further wherein the second signal including the individualized information further comprises the individual address.

9. The method of claim 1, wherein the first localized information comprises at least one of a local news information, a local traffic information, and a local weather information.

10. The method of claim 1, wherein the first localized information comprises at least one of a voice message and an alphanumeric message.

11. The method of claim 1, wherein the first time interval and the second time interval are transmission frames in a periodic cycle of transmission frames and wherein the step of transmitting the first signal including the first localized information comprises the step of:

periodically transmitting, by the first group of broadcast transmission sites during a selected transmission Frame of each periodic cycle of transmission frames, the first signal including the first localized information relating to the first local coverage area.

12. The method of claim 11, further comprising the steps of:

receiving, by the at least one communication device, a first received signal including a first received localized information transmitted during a first transmission frame of a first cycle of transmission frames to produce the first received localized information;

storing, by the at least one communication device, the first received localized information in a memory location of the at least one communication device;

receiving, by the at least one communication device, a second received signal including a second received localized information transmitted during the first transmission frame of a second cycle of transmission frames to produce the second received localized information; and storing, by the at least one communication device, the second received localized information in the memory location of the at least one communication device, such that the second received localized information replaces at least a portion of the first received localized information.

13. In a wide area communication system that includes a plurality of broadcast transmission sites and a plurality of communication devices, the plurality of broadcast transmission sites providing a plurality of broadcast services to the plurality of communication devices throughout the wide area communication system, a method for providing a plurality of localized information to at least one communication device of the plurality of communication devices that is located in a first local coverage area of a plurality of local coverage areas within the wide area communication system, the method comprising the steps of:

transmitting, by a first group of broadcast transmission sites, a first signal including a first broadcast address and a first localized information relating to the first local coverage area, the first group of broadcast transmission sites being a subset of the plurality of broadcast transmission sites and providing a first plurality of broadcast services to the first local coverage area, the first broadcast address being assigned For use in the first local coverage area; and transmitting, by the plurality of broadcast transmission sites, a second signal including an individualized information and an individual address for the at least one communication device.

14. The method of claim 13, wherein the at least one communication device is located in a second local coverage area of the plurality of local coverage areas, the method further comprising the step of:

transmitting, by a second group of broadcast transmission sites, a third signal including a second broadcast address and a second localized information relating to the second local coverage area, the second group of broadcast transmission sites being a subset of the plurality of broadcast transmission sites and providing a second plurality of broadcast services to the second local coverage area, the second broadcast address being assigned for use in the second local coverage area.

15. The method of claim 14, wherein the first broadcast address and the second broadcast address are two broadcast addresses of a group of broadcast addresses that are dedicated to providing localized information to the plurality of communication devices.

16. The method of claim 14, further comprising the steps of:

receiving, by the at least one communication device, the first signal including the first broadcast address and the first localized information relating to the first local coverage area;

determining, by the at least one communication device, a first quality characteristic of the first signal including the first broadcast address and the first localized information relating to the first local coverage to produce the first quality characteristic;

receiving, by the at least one communication device, the third signal including the second broadcast address and the second localized information relating to the second local coverage;

determining, by the at least one communication device, a second quality characteristic of the third signal including the second broadcast address and the second localized information relating to the second local coverage to produce the second quality characteristic;

comparing, by the at least one communication device, the first quality characteristic and the second quality characteristic;

storing, by the at least one communication device, the First localized information relating to the first local coverage in a memory location of the at least one communication device when the first quality characteristic is a higher quality than the second quality characteristic; and storing, by the at least one communication device, the second localized information relating to the second local coverage in the memory locution of the at least one communication device when the second quality characteristic is a higher quality than the first quality characteristic.

17. The method of claim 14, further comprising the steps of:

receiving, by the at least one communication device, the first signal including the first broadcast address and the first localized information relating to the first local coverage area;

storing, by the at Least one communication device, the First localized information relating to the first local coverage area in a memory location of the at least one communication device;

receiving, by the at least one communication device subsequent to reception of the first received localized information, the third signal including the second broadcast address and the second localized information relating to the second local coverage area;

storing, by the at least one communication device, the second localized information relating to the second local coverage area in the memory location of the at least one communication device, such that the second localized information relating to the second local coverage area replaces at least a portion of the first localized information relating to the first local coverage area.

18. The method of claim 13, wherein the first broadcast address is further assigned for use in a second local coverage area of the plurality of local coverage areas, the method further comprising the step of:

transmitting, by a second group of broadcast transmission sites, a third signal including the first broadcast address and a second localized information relating to the second local coverage area, the second group of broadcast transmission sites being a subset of the plurality of broadcast transmission sites and providing a second plurality of broadcast services to the second local coverage area, the second local coverage area being located sufficiently distant from the first local coverage area to enable a communication device of the plurality of communication devices that is located in the second local coverage area to receive the third signal including the second localized information transmitted from the second group of broadcast sites without substantial interference from the first signal including the first localized information transmitted from the first group of broadcast sites.

19. In a wide area communication system that includes a plurality of broadcast transmission sites and a plurality of communication devices, the plurality of broadcast transmission sites providing broadcast services to the plurality of communication devices throughout the wide area communication system, a method for a communication device to obtain localized information broadcast to communication devices located in a local coverage area of a plurality of local coverage areas within the wide area communication system, the method comprising the steps of:

receiving, during a first time interval, a first signal including a first localized information, the first localized information relating to a first local coverage area of the plurality of local coverage areas;

storing the first localized information in a first memory location of the communication device;

receiving, during a second time interval, a second signal including a second localized information, the second localized information relating to a second local coverage area of the plurality of local coverage areas; and storing the second localized information in the first memory location of the communication device, such that the second localized information replaces al least a portion of the first localized information.

20. The method of claim 19, further comprising the steps of:

receiving, during at least a third time interval, a third signal including an individualized information; and storing the individualized information in a second memory location of the communication device.

21. The method of claim 19, further comprising the steps of:

prior to the step of storing the second localized information,
determining a first quality characteristic of the first signal including the first localized information and a second quality characteristic of the second signal including the second localized information to produce a first quality characteristic and a second quality characteristic; and
comparing the first quality characteristic and the second quality characteristic, wherein the step of storing the second localized information comprises the step of storing the second localized information in the first memory location of the communication device when the second quality characteristic of the second signal including the second localized information is a higher quality transmission than the first quality characteristic of the first signal including the first localized in formation.

22. In a wide area communication system that includes a plurality of broadcast transmission sites and a plurality of communication devices, the plurality of broadcast transmission sites providing broadcast services to the plurality of communication devices throughout the wide area communication system, a method for a communication device to retain localized information broadcast to communication devices located in a local coverage area of a plurality of local coverage areas within the wide area communication system, the method comprising the steps of:

receiving a first signal including a first broadcast address and a first localized information, wherein the first broadcast address corresponds to a first local coverage area of the plurality of local coverage areas and wherein the first localized information relates to the first local coverage area;

storing the first localized information in a first memory location of the communication device;

receiving a second signal including a second broadcast address and a second localized information, wherein the second broadcast address corresponds to a second local coverage area of the plurality of local coverage areas and wherein the second localized information relates to the second local coverage area; and storing the second localized information in the first memory location, such that the second localized information replaces at least a portion of the first localized information.

23. The method of claim 22, further comprising the steps or:

receiving a third signal including an individual address of the communication device and an individualized information; and storing the individualized information in a second memory location of the communication device.

24. The method of claim 22, further comprising the steps of:
prior to the step of storing the second localized information,
determining a first quality characteristic of the first signal including the first localized information and a second quality characteristic of the second signal including the second localized information to the first quality characteristic and the second quality characteristic; and
comparing the first quality characteristic and the second quality characteristic;
wherein the step of storing the second localized information comprises the step of storing the second localized information in the first memory location of the communication device when the second quality characteristic of the second signal including the second localized information is a higher quality transmission than the first quality characteristic of the first signal including the first localized information.

25. A communication device for use in a wide area communication system, the communication device comprising:
a device receiver for receiving, during a first dine interval, a first localized information and, during a second time interval, a second localized information, the first localized information and the second localized information each relating to a respective geographic region of the wide area communication system;
a memory that includes a plurality of memory locations; and
a processor, operably coupled to the memory and the device receiver, for instructing the memory to store the first localized in Formation in a first memory location of the plurality of memory locations upon receipt of the first localized information and for instructing the memory to store the second localized information in the first memory location upon receipt of the second localized information, such that the second localized information replaces at least a portion of the first localized information.

26. The communication device of claim 25, further comprising an information interface coupled to the processor, wherein the processor further instructs the information interface to present to a user of the communication device at least a visual indication that at least one of the first localized information and the second localized information is stored in the memory.

27. The communication device of claim 25, further comprising an alerting device coupled to the processor, wherein the processor further instructs the alerting device to alert a user of the communication device that at least one of the first localized information and the second localized information is stored in the memory.

28. A broadcast transmission site for providing information from at least one information source to a plurality of communication devices located within a geographic coverage area serviced by the broadcast transmission site, the broadcast transmission site comprising:
a transmitter;
an input interface for receiving, from the at least one information source, information to be transmitted by the transmitter; and
a controller, operably coupled to the transmitter and the input interface, for instructing the transmitter to transmit, during a first time interval, a first signal including a localized information relating to the geographic coverage area that is intended for receipt by the plurality of communication devices located within the geographic coverage area and for instructing the transmitter to transmit, during a second time interval, a second signal including am individualized information that is intended for receipt by less than all of the plurality of communication devices regardless of the location relative to the geographic coverage area of the less than all of the plurality of communication devices intended to receive the individualized information.

* * * * *